United States Patent
Chen et al.

(10) Patent No.: US 10,298,046 B2
(45) Date of Patent: May 21, 2019

(54) CHARGING METHOD OF CONTROLLING OUTPUT VOLTAGES, APPARATUS AND ADAPTER

(71) Applicant: Guangdong Oppo Mobile Telecommunications Corp., Ltd., Dongguan (CN)

(72) Inventors: Shebiao Chen, Dongguan (CN); Jun Zhang, Dongguan (CN); Chen Tian, Dongguan (CN); Bo Yang, Dongguan (CN); Jialiang Zhang, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 38 days.

(21) Appl. No.: 15/552,877

(22) PCT Filed: May 9, 2016

(86) PCT No.: PCT/CN2016/081414
§ 371 (c)(1),
(2) Date: Aug. 23, 2017

(87) PCT Pub. No.: WO2017/193259
PCT Pub. Date: Nov. 16, 2017

(65) Prior Publication Data
US 2018/0175651 A1    Jun. 21, 2018

(51) Int. Cl.
*H02J 7/04* (2006.01)
*H02J 7/16* (2006.01)
(Continued)

(52) U.S. Cl.
CPC .......... *H02J 7/0093* (2013.01); *H02J 7/0073* (2013.01); *H02J 7/022* (2013.01); *H02M 3/1582* (2013.01);
(Continued)

(58) Field of Classification Search
CPC ........ H02J 7/022; H02J 7/0093; H02J 7/0068; H02J 7/0072; Y02E 60/12
(Continued)

(56) References Cited

U.S. PATENT DOCUMENTS 5,195,045 A  *  3/1993  Keane .............. H01J 37/32082
                                                    315/111.51
6,246,215 B1     6/2001  Popescu-Stanesti
(Continued)

FOREIGN PATENT DOCUMENTS

CN   101340139   1/2009
CN   201450454   5/2010
(Continued)

OTHER PUBLICATIONS

International Search Report and the Written Opinion dated Jan. 26, 2017 from the International Searching Authority Re. Application No. PCT/CN2016/081414 and Its Translation into English. (8 pages).

*Primary Examiner* — Arun C Williams
(74) *Attorney, Agent, or Firm* — Young Basile Hanlon & MacFarlane, P.C.

(57) ABSTRACT

In a charging method of controlling output voltages, a controller acquires first mapping relation that is a one-to-one mapping relation between at least two adjustment strategies and at least two duty cycles. Each of the adjustment strategies comprises indication information of an adjustment direction of an output voltage of a power converter. The controller determines a first adjustment strategy. The controller generates a pulse width modulation (PWM) signal based on the first adjustment strategy and the first mapping relation. The duty cycle of the PWM signal is one of the at least two duty cycles indicated by the first mapping relation and corresponds to the first adjustment strategy. The controller transmits the PWM signal such that the adjustment direction of the output voltage of the power converter corresponds to the first adjustment strategy.

11 Claims, 12 Drawing Sheets

(51) Int. Cl.
  *H02J 7/00*     (2006.01)
  *H02J 7/02*     (2016.01)
  *H02M 3/158*    (2006.01)
  *H02M 7/12*     (2006.01)
  *H02M 1/00*     (2006.01)

(52) U.S. Cl.
  CPC ....... H02M 7/12 (2013.01); *H02J 2007/0059* (2013.01); *H02M 2001/0009* (2013.01)

(58) Field of Classification Search
  USPC ......................................................... 320/145
  See application file for complete search history.

(56) References Cited

U.S. PATENT DOCUMENTS

| | | | | |
|---|---|---|---|---|
| 2004/0075418 | A1* | 4/2004 | Densham | H02J 7/0068 320/111 |
| 2007/0069707 | A1 | 3/2007 | Miyashita et al. | |
| 2009/0009153 | A1 | 1/2009 | Wong et al. | |
| 2011/0285375 | A1* | 11/2011 | Deboy | G05F 1/67 323/299 |
| 2013/0049703 | A1* | 2/2013 | Perisic | H01M 10/44 320/162 |
| 2013/0076312 | A1 | 3/2013 | Huang et al. | |
| 2013/0271077 | A1 | 10/2013 | Kim et al. | |
| 2014/0043860 | A1 | 2/2014 | Luh et al. | |
| 2015/0162828 | A1 | 6/2015 | Sandner et al. | |

FOREIGN PATENT DOCUMENTS

| | | |
|---|---|---|
| CN | 102195495 A | 9/2011 |
| CN | 102843051 A | 12/2012 |
| CN | 103222173 | 7/2013 |
| CN | 103856055 A | 6/2014 |
| CN | 203747485 | 7/2014 |
| CN | 104426394 | 3/2015 |
| CN | 104868573 | 8/2015 |
| CN | 205123394 | 3/2016 |
| CN | 105631129 | 6/2016 |
| TW | 201415209 | 4/2014 |
| TW | M520156 | 4/2016 |
| TW | M532118 | 2/2018 |

\* cited by examiner

300 acquiring, by a controller, first mapping relation that is a one-to-one mapping relation between at least two adjustment strategies and at least two duty cycles, wherein each of the at least two adjustment strategies comprises indication information of an adjustment direction of an output voltage of a power converter  S310 determining, by the controller, a first adjustment strategy  S320 generating, by the controller, a pulse width modulation (PWM) signal based on the first adjustment strategy and the first mapping relation, wherein a duty cycle of the PWM signal is one of the at least two duty cycles indicated by the first mapping relation and corresponds to the first adjustment strategy  S330 transmitting, by the controller, the PWM signal, such that the adjustment direction of the output voltage of the power converter corresponds to the first adjustment strategy  S340

S410: acquiring, by a filter, a second mapping relation that is a one-to-one mapping relation between at least two duty cycles and at least two feedback voltage values S420: receiving, by the filter, a PWM signal transmitted by the controller, wherein the controller determines the PWM signal based on a first adjustment strategy of at least two adjustment strategies and first mapping relation, the first mapping relation is a one-to-one mapping relation between the at least two adjustment strategies and at least two duty cycles, each of the at least two adjustment strategies comprises indication information of an adjustment direction of an output voltage of a power converter, and the duty cycle of the PWM signal is one of the at least two duty cycles indicated by the first mapping relation and corresponds to the first adjustment strategy S430: generating, by the filter, a voltage feedback signal based on the PWM signal and the second mapping relation, wherein each of the at least two feedback voltage values corresponding to the voltage feedback signal is a voltage value indicated by the second mapping relation and corresponds to the duty cycle of the PWM signal S440: transmitting, by the filter, the voltage feedback signal to the power converter such that the power converter adjusts the output voltage based on the voltage feedback signal

FIG. 5

500 acquiring, by a power converter, first mapping relation that is a one-to-one mapping relation between at least two adjustment strategies and at least two duty cycles, wherein each of the at least two adjustment strategies comprises indication information of an adjustment direction of an output voltage of a power converter  S510 receiving, by the power converter, a PWM signal transmitted by a controller, wherein the controller determines the PWM signal based on the first adjustment strategy and the first mapping relation, and the duty cycle of the PWM signal is one of the at least two duty cycles indicated by the first mapping relation and corresponds to the first adjustment strategy  S520 determining, by the power converter, the first adjustment strategy based on the PWM signal and the first mapping relation  S530 adjusting, by the power converter, the output voltage based on the first adjustment strategy  S550

CHARGING METHOD OF CONTROLLING OUTPUT VOLTAGES, APPARATUS AND ADAPTER

RELATED APPLICATIONS

This application is a National Phase of PCT Patent Application No. PCT/CN2016/081414 having International filing date of May 9, 2016. The contents of the above application are all incorporated by reference as if fully set forth herein in their entirety.

FIELD AND BACKGROUND OF THE INVENTION

The present disclosure relates to a technical field of charging operations, and more particularly to a charging method of controlling output voltages, an apparatus, and an adapter.

Currently, electronic devices, such as mobile phones, are installed with rechargeable batteries and thus, adapters can charge the batteries.

In charging operations, the adapters convert alternating current voltage into direct current voltage by a power converter and transmit the direct current voltage to the electronic devices. This can cause an adapter to output a larger voltage, which results in damage and even can cause the batteries to explode which seriously affects safety of the batteries.

In a related art output voltage control method, a controller and a digital potentiometer are installed in the adapter. The controller controls the digital potentiometer by inter-integrated circuit (I2C) instructions in the adapter, so that electrical levels of feedback pins of an alternating current-direct current (AC-DC) control chip in the power converter change. The AC-DC control chip then adjusts the output voltage of the power converter based on electrical level changes of the feedback pins and thus, increasing safety of the batteries.

However, costs of the digital potentiometer are high and at least two feedback pins are used to transmit the I2C instructions to control the digital potentiometer. In other words, in order to control the digital potentiometer, occupation of the at least two feedback pins of the controller affects use efficiency of the controller.

SUMMARY OF THE INVENTION

Embodiments of the present disclosure provide a charging method of controlling output voltages, an apparatus and an adapter to increase charging safety, reduce costs, and improve use efficiency of components.

A first aspect provides a charging method of controlling output voltages. The method includes acquiring, by a controller, first mapping relation that is one-to-one mapping relation between at least two adjustment strategies and at least two duty cycles, wherein each of the at least two adjustment strategies includes indication information of an adjustment direction of an output voltage of a power converter; determining, by the controller, a first adjustment strategy; generating, by the controller, a pulse width modulation (PWM) signal based on the first adjustment strategy and the first mapping relation, wherein the duty cycle of the PWM signal is one of the at least two duty cycles indicated by the first mapping relation and corresponds to the first adjustment strategy; and transmitting, by the controller, the PWM signal, such that the adjustment direction of the output voltage of the power converter corresponds to the first adjustment strategy.

In combination with the first aspect, according to a first implementation of the first aspect, transmitting, by the controller, the PWM signal includes transmitting, by a pin of the controller, the PWM signal.

In combination with the first aspect, according to a seventh implementation of the first aspect, acquiring, by a filter, a second mapping relation that is a one-to-one mapping relation between at least two duty cycles and at least two feedback voltage values, wherein the at least two adjustment strategies comprises the first adjustment strategy; receiving, by the filter, a PWM signal transmitted by the controller; generating, by the filter, a voltage feedback signal based on the PWM signal and the second mapping relation, wherein each of the at least two feedback voltage values corresponding to the voltage feedback signal is a voltage value indicated by the second mapping relation and corresponds to the duty cycle of the PWM signal; and transmitting, by the filter, the voltage feedback signal to the power converter such that the power converter adjusts the output voltage based on the voltage feedback signal.

In combination with the first aspect and the implementation, according to a second implementation of the first aspect, transmitting, by the controller, the PWM signal includes transmitting, by the controller, the PWM signal to a filter such that the filter, based on the PWM signal and second mapping relation, generates a voltage feedback signal and transmits the voltage feedback signal to the power converter, wherein the second mapping relation is a one-to-one mapping relation between the at least two duty cycles and at least two feedback voltage values, and each of the at least two feedback voltage values corresponding to the voltage feedback signal is a voltage value indicated by the second mapping relation and corresponds to the duty cycle of the PWM signal.

In combination with the first aspect, according to a eighth implementation of the first aspect, acquiring, by a power converter, the first mapping relation; receiving, by the power converter, a PWM signal transmitted by a controller; determining, by the power converter, the first adjustment strategy based on the PWM signal and the first mapping relation; and adjusting, by the power converter, the output voltage based on the first adjustment strategy.

In combination with the first aspect and the implementation, according to a third implementation of the first aspect, transmitting, by the controller, the PWM signal includes transmitting, by the controller, the PWM signal to the power converter such that the power converter, based on the PWM signal and the first mapping relation, determines the first adjustment strategy and adjusts the output voltage based on the first adjustment strategy.

In combination with the first aspect and the implementation, according to a fourth implementation of the first aspect, each of the adjustment strategies further includes indication information of an adjustment amplitude of the output voltage of the power converter.

In combination with the first aspect and the implementation, according to a fifth implementation of the first aspect, determining, by the controller, the first adjustment strategy includes receiving, by the controller, control information transmitted by an external device, wherein the external device receives the output voltage and the control information is configured to determine the first adjustment strategy; and determining, by the controller, the first adjustment strategy based on the control information.

In combination with the fourth aspect and the implementation, according to a first implementation of the fourth aspect, the processor is configured to execute the executable program instructions performing following operations: acquiring a second mapping relation that is a one-to-one mapping relation between at least two duty cycles and at least two feedback voltage values, wherein the at least two adjustment strategies comprises the first adjustment strategy; receiving a PWM signal transmitted by the controller; generating a voltage feedback signal based on the PWM signal and the second mapping relation, wherein each of the at least two feedback voltage values corresponding to the voltage feedback signal is a voltage value indicated by the second mapping relation and corresponds to the duty cycle of the PWM signal; and transmitting the voltage feedback signal to the power converter such that the power converter adjusts the output voltage based on the voltage feedback signal.

In combination with the fourth aspect and the implementation, according to a second implementation of the fourth aspect, the processor is configured to execute the executable program instructions performing following operations: acquiring the first mapping relation; receiving a PWM signal transmitted by a controller; determining the first adjustment strategy based on the PWM signal and the first mapping relation; and adjusting the output voltage based on the first adjustment strategy.

In combination with the first aspect and the implementation, according to a sixth implementation of the first aspect, determining, by the controller, the first adjustment strategy includes determining, by the controller, a target output voltage; determining, by the controller, a first output voltage, wherein the first output voltage is a voltage output by the power converter before a first time interval; determining, by the controller, the first adjustment strategy based on a difference between the first output voltage and a preset target output voltage, wherein the first adjustment strategy is configured to adjust the output voltage of the power converter in the first time interval such that the output voltage of the power converter in the first time interval approaches the target output voltage.

A second aspect provides a charging method of controlling output voltages. The method includes acquiring, by a filter, a second mapping relation that is one-to-one mapping relation between at least two duty cycles and at least two feedback voltage values; receiving, by the filter, a PWM signal transmitted by the controller, wherein the controller determines the PWM signal based on a first adjustment strategy of at least two adjustment strategies and first mapping relation, the first mapping relation is a one-to-one mapping relation between the at least two adjustment strategies and at least two duty cycles, each of the at least two adjustment strategies comprises indication information of an adjustment direction of an output voltage of a power converter, and the duty cycle of the PWM signal is one of the at least two duty cycles indicated by the first mapping relation and corresponds to the first adjustment strategy; generating, by the filter, a voltage feedback signal based on the PWM signal and the second mapping relation, wherein each of the at least two feedback voltage values corresponding to the voltage feedback signal is a voltage value indicated by the second mapping relation and corresponds to the duty cycle of the PWM signal; and transmitting, by the filter, the voltage feedback signal to the power converter such that the power converter adjusts the output voltage based on the voltage feedback signal.

In combination with the second aspect, according to a first implementation of the second aspect, receiving, by the filter, the PWM signal transmitted by the controller includes receiving, by a pin of the filter, the PWM signal transmitted by the controller.

A third aspect provides a charging method of controlling output voltages. The method includes acquiring, by a power converter, first mapping relation that is one-to-one mapping relation between at least two adjustment strategies and at least two duty cycles, wherein each of the at least two adjustment strategies includes indication information of an adjustment direction of an output voltage of a power converter; receiving, by the power converter, a PWM signal transmitted by a controller, wherein the controller determines the PWM signal based on the first adjustment strategy and the first mapping relation, and the duty cycle of the PWM signal is one of the at least two duty cycles indicated by the first mapping relation and corresponds to the first adjustment strategy; determining, by the power converter, the first adjustment strategy based on the PWM signal and the first mapping relation; and adjusting, by the power converter, the output voltage based on the first adjustment strategy.

In combination with the third aspect, according to a first implementation of the third aspect, receiving, by the power converter, the PWM signal transmitted by the controller includes receiving, by a pin of the power converter, the PWM signal transmitted by the controller.

In combination with the third aspect and the implementation, according to a first implementation of the third aspect, each of the at least two adjustment strategies further includes indication information of an adjustment amplitude of the output voltage.

A fourth aspect provides a charging apparatus of controlling output voltages. The charging apparatus includes a plurality of units that perform actions of the first aspect and the implementations of the first aspect.

A fifth aspect provides a charging apparatus of controlling output voltages. The charging apparatus includes a plurality of units that perform actions of the second aspect and the implementations of the second aspect.

A sixth aspect provides a charging apparatus of controlling output voltages. The charging apparatus includes a plurality of units that perform actions of the third aspect and the implementations of the third aspect.

A seventh aspect provides an equipment of controlling output voltages. The equipment includes a memory and a processor. The memory stores computer programs. The processor executes and operates the computer programs in the memory such that the equipment transmits upstream information and performs the first aspect and any one of the methods of controlling output voltages of the implementations in the first aspect.

An eighth aspect provides an equipment of controlling output voltages. The equipment includes a memory and a processor. The memory stores computer programs. The processor executes and operates the computer programs in the memory such that the equipment transmits upstream information and performs the second aspect and any one of the methods of controlling output voltages of the implementations in the second aspect.

A ninth aspect provides an equipment of controlling output voltages. The equipment includes a memory and a processor. The memory stores computer programs. The processor executes and operates the computer programs in the memory such that the equipment transmits upstream information and performs the third aspect and any one of the methods of controlling output voltages of the implementations in the third aspect.

A tenth aspect provides a computer program product. The computer program product includes computer program codes. The computer program codes can be installed in a transceiver, a processing unit, a transceiver, or a processor of a controller in an adapter such that the controller performs the first aspect and any one of the methods of controlling output voltages of the implementations in the first aspect.

An eleventh aspect provides a computer program product. The computer program product includes computer program codes. The computer program codes can be installed in a transceiver, a processing unit, a transceiver, or a processor of a controller in an adapter such that the controller performs the second aspect and any one of the methods of controlling output voltages of the implementations in the second aspect.

A twelfth eleventh aspect provides a computer program product. The computer program product includes computer program codes. The computer program codes can be installed in a transceiver, a processing unit, a transceiver, or a processor of a controller in an adapter such that the controller performs the third aspect and any one of the methods of controlling output voltages of the implementations in the third aspect.

A thirteenth aspect provides a computer readable storage medium. The computer readable storage medium stores programs that cause a controller in the adapter to execute the first aspect and any one of the methods of controlling output voltages of the implementations in the first aspect.

A fourteenth aspect provides a computer readable storage medium. The computer readable storage medium stores programs that cause a controller in the adapter to execute the second aspect and any one of the methods of controlling output voltages of the implementations in the second aspect.

A fifteenth aspect provides a computer readable storage medium. The computer readable storage medium stores programs that cause a controller in the adapter to execute the third aspect and any one of the methods of controlling output voltages of the implementations in the third aspect.

A sixteenth aspect provides an adapter. The adapter includes a power converter configured to obtain an alternating current from a power source and convert the alternating current into a direct current; and a controller configured to generate, based on a first adjustment strategy of at least two adjustment strategies and first mapping relation, a PWM signal for transmitting the PWM signal, such that an adjustment direction of an output voltage of the direct current of the power converter corresponds to the first adjustment strategy, wherein the first mapping relation is a one-to-one mapping relation between the at least two adjustment strategies and at least two duty cycles, each of the adjustment strategies comprises indication information of the adjustment direction of the output voltage of the power converter, and the duty cycle of the PWM signal is one of the at least two duty cycles indicated by the first mapping relation and corresponds to the first adjustment strategy of the at least two adjustment strategies.

In combination with the sixteenth aspect, according to a first implementation of the sixteenth aspect, the adapter further includes a filter connected to the power converter and the controller for receiving the PWM signal, and configured to generate, based on the PWM signal and second mapping relation, a voltage feedback signal for transmitting the voltage feedback signal to the power converter, wherein the second mapping relation is a one-to-one mapping relation between the at least two duty cycles and at least two feedback voltage values, the voltage feedback signal carries the at least two feedback voltage values, and each of the at least two feedback voltage values corresponding to the voltage feedback signal is a voltage value indicated by the second mapping relation and correspond to the duty cycle of the PWM signal; and the power converter further configured to adjust the output voltage based on the voltage feedback signal. In embodiments of the present disclosure, each of the fourth aspect through the sixteenth aspect includes a processor and a memory, wherein the memory is configured to store executable program instructions, the processor is configured to execute the executable program instructions performing corresponding operations in the fourth aspect through the sixteenth aspect.

In a charging method of controlling output voltages, an apparatus and an adapter according to embodiments of the present disclosure, the controller generates a PWM signal corresponding to the duty cycles and the first adjustment strategy, and controls the power converter that adjusts the output voltage by the PWM signal. Since a pin transmits the PWM signal, the pins of the controller are reduced and the use efficiency of the controller is increased. Moreover, since the duty cycle of the PWM signal is used to determine the first adjustment strategy, therefore, the output voltage of the power converter can be controlled only by identifying the duty cycle of the PWM signal, such that manufacturing cost can be reduced without a digital potentiometer with relatively higher cost in the related art.

BRIEF DESCRIPTION OF THE SEVERAL VIEWS OF THE DRAWINGS

The following embodiments refer to the accompanying drawings for exemplifying specific implementable embodiments of the present disclosure. It should be noted that the following drawing are exemplary embodiments and persons of ordinary skill in the art, without paying any creative effort, can obtain other drawings based on these drawings, where:

FIG. 3 is an illustrative flowchart of the charging method of controlling the output voltages according to one embodiment of the present disclosure.

FIG. 5 is an illustrative flowchart of the charging method of controlling the output voltages according to another embodiment of the present disclosure.

FIG. 6 is yet another illustrative flowchart of the charging method of controlling the output voltages according to another embodiment of the present disclosure.

DESCRIPTION OF SPECIFIC EMBODIMENTS OF THE INVENTION

The following embodiments refer to the accompanying drawings for exemplifying specific implementable embodiments of the present disclosure in a suitable computing environment. It should be noted that the exemplary described embodiments are configured to describe and understand the present disclosure, but the present disclosure is not limited thereto.

First, in combination with FIG. 1 and FIG. 2, a structure of an adapter 100 that uses a charging method and a charging apparatus of controlling output voltages according to embodiments of the present disclosure are described below.

Figure 1:
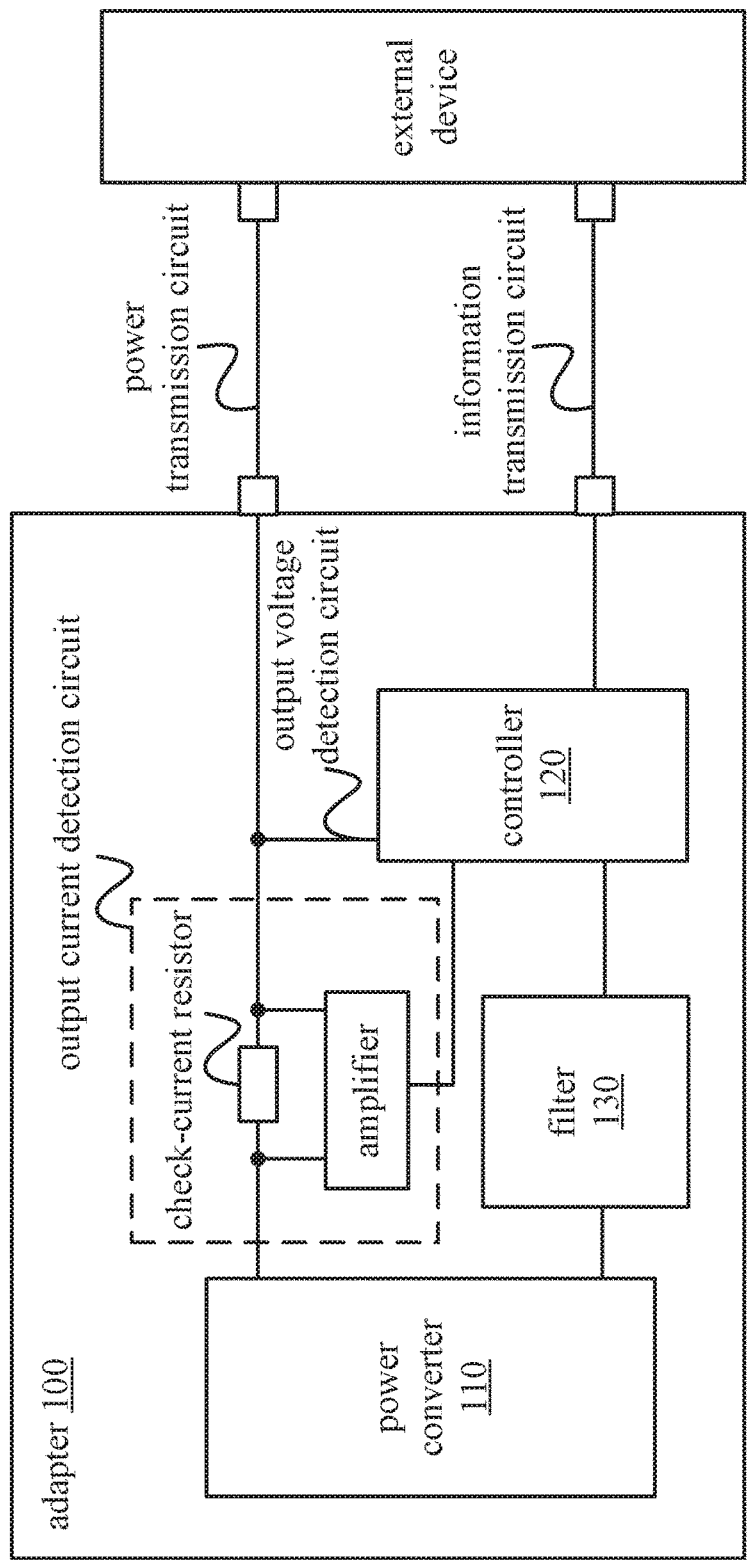
FIG. 1 is an illustrative structural diagram of an adapter for performing a charging method of controlling output voltages according to one embodiment of the present disclosure.

FIG. 1 is an illustrative structural diagram of an adapter 100 for performing a charging method of controlling output voltages according to one embodiment of the present disclosure.

As shown in FIG. 1, the adapter 100 includes the following components.

A power converter 110 is configured to obtain alternating current from a power source and converts the alternating current into direct current.

A controller 120 is configured to generate a pulse width modulation (PWM) signal based on a first adjustment strategy of at least two adjustment strategies and first mapping relation, such that the adjustment direction of the output voltage of the direct current of the power converter corresponds to the first adjustment strategy. The first mapping relation is a one-to-one mapping relation between the at least two adjustment strategies and at least two duty cycles. Each of the adjustment strategies includes indication information of an adjustment direction of an output voltage of a power converter. The duty cycle of the PWM signal is one of the at least two duty cycles indicated by the first mapping relation and corresponds to the first adjustment strategy of the at least two adjustment strategies.

A filter 130 is connected to the power converter and the controller. The filter 130 is configured to receive the PWM signal and generates a voltage feedback signal which is transmitted to the power converter based on the PWM signal and second mapping relation. The second mapping relation is a one-to-one mapping relation between the at least two duty cycles and at least two feedback voltage values. The voltage feedback signal carries the at least two feedback voltage values. Each of the at least two feedback voltage values corresponding to the voltage feedback signal is a voltage value indicated by the second mapping relation and corresponds to the duty cycle of the PWM signal.

The power converter 110 is further used to adjust the output voltage based on the voltage feedback signal.

The structure of each component is described in detail below.

A. Power Converter 110

In one embodiment of the present disclosure, the power converter 110 is used to obtain the alternating current from the power source and converts the alternating current into the direct current.

In detail, as shown in FIG. 1, the adapter 100 connects to an external device such that an adapter 100 and an external power supply of the external device form a power supply loop. Thus, the power converter 110 can obtain the alternating current from the eternal power supply through the power supply loop, and then the alternating current is subjected to an alternating current and direct current conversion processing so as to generate a direct current voltage (i.e., an example of an output voltage). In one embodiment, the direct current voltage is less than or equal to five volts.

Additionally, the alternating current and direct current conversion process of the power converter 110 are enumerated in the following operations.

First, for example, the power converter 110 makes a voltage transformation (e.g., voltage reduction) of an alternating current voltage 110V or 220V from the external power supply (e.g., a power grid) to obtain a preset voltage (e.g., less than or equal to 5 volts) of the alternating current.

Thereafter, the power converter 110 rectifies and filters the preset voltage of the alternating current to obtain a direct current voltage.

In different embodiments of the present disclosure, the adapter 100 includes a power output port that further includes a positive output port and a negative output port. The power converter 100 connects to the positive output port and the negative output port, such that the direct current voltage as described above can be applied to the positive output port, and thus, the direct current voltage (i.e., another example of the output voltage) is generated between the positive output port and the negative output port.

In one embodiment of the present disclosure, the power output port can be a universal serial bus (USB) interface for transmitting current.

Thus, the adapter 100 (e.g., via a charging cable) is connected to the mobile terminal (e.g., a mobile phone). For example, when connected through a USB interface, the power output port connects to a power input port of the mobile terminal. The positive output port (e.g., via the charging cable) connects to a positive input port in the power input port of the mobile terminal, and the negative output port connects to a negative input port in the power input port of the mobile terminal. Furthermore, the positive input port in the power input port connects to a positive electrode of a battery of the mobile terminal, and the negative input port in the power input port connects to a negative electrode of the battery of the mobile terminal. Therefore, when connecting the adapter to the mobile terminal, a charging loop is formed and charges the battery of the mobile terminal.

In addition, the power converter 110 is used to adjust the output voltage. A control part, such as an alternating current-direct current (AC-DC) control chip, is configured in the power converter 110. The control part can change the output voltage of the power converter 110 based on a feedback voltage value corresponding to the voltage feedback signal from the filter 130.

For example, the power converter 110 can adjust the output voltage according to a manner in which the output voltage and the feedback voltage value are kept in a preset ratio. In another embodiment of the present disclosure, the feedback voltage value can be at least two preset voltage values, where an indication adjustment strategy of one voltage value is used to increase the output voltage according to a preset adjustment amount (e.g., an adjustment step). In another example, an indication adjustment strategy of the other voltage value is used to decrease the output voltage according to the preset adjustment amount.

It should be understood that the method and the process of adjusting the output voltage by the power converter 110 are merely exemplary, but not limited thereto. In different embodiments, the method and the process of adjusting the output voltage by the power converter 110 can also be similar to related art. In order to avoid repeated descriptions, detailed descriptions thereof are omitted here.

In one embodiment of the present disclosure, the power converter 110 connects and communicates with the filter 130 such that the power converter 110 obtains the feedback voltage value from the filter 130.

B. Controller 120

In one embodiment of the present disclosure, the controller 120 is used to determine the adjustment strategy of the output voltage.

In one embodiment, the adjustment strategy is a strategy that is an adjustment direction of the output voltage. For example, the adjustment strategy means increasing or decreasing the output voltage.

In another embodiment, the adjustment strategy is a strategy that is an adjustment amplitude of the output voltage. For example, the adjustment strategy is difference indication information between the output voltages after and before making voltage adjustments. For example, the adjustment strategy is a specific voltage which the output voltage reaches after making a voltage adjustment.

In one embodiment of the present disclosure, the controller 120 can periodically determine the adjustment strategy, where a periodical interval can be set by user or manufacturers based on factory settings or charging software updating. Additionally, the periodical interval can be set based on a standard protocol.

In one embodiment, the controller 120 also determines the adjustment strategy according to an indication of the external device (e.g., an electronic device as a charging target).

In one embodiment, the controller 120 includes the following structure of determining the adjustment strategy.

B1. Output Current Detection Circuit

As shown in FIG. 1 of the present disclosure, the output current detection circuit is arranged between a DC voltage output path and the controller 120 in the adapter 100.

For example, the output current detection circuit includes a current detection resistor arranged between an output terminal of the power converter 110 and an output terminal of the adapter 100. In other words, the current detection resistor connects to the external device in series. In one embodiment, a current flowing through the current detection resistor is the same as a current outputting from the adapter 100. A voltage at two ends of the current detection resistor is proportional to the output voltage of the adapter.

Furthermore, in order to avoid excessive heat of the current detection resistor and reducing voltage division effect of the check-current resistor on the output voltage, a resistance of the current detection resistor is decreased, and the voltage at two ends of the current detection resistor is smaller. The output current detection circuit further includes an amplifier (e.g., a differential amplifier) such that the controller 120 (e.g., an analog-to-digital converter, ADC) easily determines an output current based on the resistance of the current detection resistor and the voltage detected by the amplifier at two ends of the current detection resistor.

Therefore, the controller 120 determines the output current of the adapter 100 (or the power converter 110) based on the output current detection circuit.

For example, if a constant current charging is used in the external device, the controller 120 determines a target current based on a requirement of charging current (e.g., external device needs or prescribed protocols). The controller 120 further determines the adjustment strategy according to a difference of the output current and the target current. The determination process will be described in detail below.

B2. Output Voltage Detection Circuit

As shown in FIG. 1 of the present disclosure, the output voltage detection circuit is arranged between a DC voltage output path and the controller 120 in the adapter 100.

For example, the output voltage detection circuit includes a voltage sensor for detecting a voltage between the positive output port and of the negative output port of the adapter 100 (or the power converter 110). The voltage sensor transmits the detected voltage to the controller 120 by the output voltage detection circuit.

In one embodiment, the controller 120 includes an element for detecting a voltage value, where the output voltage detection circuit is a connection circuit of the positive output port and of the negative output port of the adapter 100 (or the power converter 110) to the controller 120.

Therefore, the controller 120 determines the output voltage of the adapter 100 (or the power converter 110) based on the output voltage detection circuit.

For example, if a constant voltage charging is applied to the external device, the controller 120 determines a target voltage based on a requirement of charging voltage (e.g., the external device needs or the prescribed protocols). The controller 120 further determines the adjustment strategy according to a difference of the output voltage and the target voltage. The determination process will be described in detail below.

B3. Information Transmission Circuit

As shown in FIG. 1 of the present disclosure, the adapter 100 includes an information transmission port and the controller 120 includes a transceiver for receiving information from the external device. The information transmission port connects to the transceiver to form the information transmission circuit.

Thus, if the adapter 100 (e.g., via a charging cable) is connected to the mobile terminal (e.g., a mobile phone), the controller receives control information (e.g., control parameters) from the external device via the information transmission circuit.

The controller 120 further determines the adjustment strategy according to the control information. The determination process will be described in detail below.

It should be noted that, in one embodiment, the information transmission port is a USB interface that transmits data or signals. The adapter includes an electrical connector, such as a connector receptacle or a connector plug. The power output port and the information transmission port of the adapter are integrated into the electrical connector of the adapter. For example, the electrical connector is a USB connector selected from one group consisting of standard USB connector, a micro-USB connector, and a mini-USB connector.

In one embodiment of the present disclosure, the controller 120 is further configured to generate the PWM signal based on adjustment strategies. For example, the controller 120 determines duty cycles of the PWM signal according to the adjustment strategies. The determination process will be described in detail below.

The PWM manner is an analog control mode that modulates a bias of a base electrode of a transistor or a gate electrode of a metal-oxide-semiconductor (MOS) transistor based on corresponding electrical load, and changes turn-on time of the transistor and the MOS transistor such that the adapter stably outputs power. According to the method, the output voltage of the power supply keeps constant when operation conditions of the adapter change.

A waveform of the PWM signal (also referred to as a PWM waveform) is a pulse waveform having a variable duty cycle.

In one embodiment, the duty cycle is defined as a ratio of turn-on time to a turn-on period of a pulse signal. For example, in a series of pulse cycle sequences (e.g., square waves), the ratio is proportion of a positive pulse duration and total pulse signal period.

In one embodiment, the duty cycle is defined as a time ratio of a high level in one period. For example, if the duty cycle of a signal is 50% (or the duty ration is 0.5), the time of the high level (e.g., a positive level) of the pulse signal is defined as 0.5 period.

In one embodiment of the present disclosure, the controller 120 connects and communicates with the filter 130 such that the controller 120 transmits the generated PWM signal to the filter 130. The filter 130 determines a feedback voltage value to the power converter 110 based on the PWM signal (i.e., the duty cycle of the PWM signal).

In one embodiment, the controller 120 is a microcontroller unit (MCU).

The MCU is also called a single-chip microcomputer or a single-chip device. The MCU includes a central processing unit (CPU) having appropriately reduced operation frequency and hardware specification, where the CPU is integrated with a memory, a counter, USB interfaces, A/D converters, an UART interface, a PLC interface, a DMA interface, and other peripheral interfaces, and even an LCD driving circuit to form a single chip. Thus, the MCU forms a chip-level computer such that different combination controls are carried out for different application occasions.

Filter 130

In one embodiment, the filter 130 connects and communicates with the controller 120 such that the filter 130 obtains the PWM signal from the controller 120.

For example, the filter 130 is a low-pass filter. The low-pass filter allows signals lower than cut-off frequency to pass, and does not allow the signals higher than the cut-off frequency to pass. The cut-off frequency is a frequency signal lower than a high level of the PWM signal, and is a frequency signal higher than a low level of the PWM signal such that low level parts of the PWM signal pass the low-pass filter. In one embodiment, a timer of the filter 130 is configured to record total transmission duration of the PWM signal and transmission duration of the PWM signal through the filter 130, such that the duty cycle of the PWM signal is determined. The total transmission duration of the PWM signal includes transmission duration of the high level and low level of the PWM signal, and the transmission duration of the PWM signal through the filter 130 includes transmission duration of the low level of the PWM signal.

It should be noted that the filter 130 is merely exemplary. If the filter 130 ensures determination of the duty cycle of the PWM signal from the controller 120, a structure of the filter 130 can be properly modified.

In one embodiment of the present disclosure, the filter 130 connects and communicates with the power converter 110 such that the filter 130 sends the voltage feedback signal to the power converter 110. The power converter 110 adjusts the output voltage based on the feedback voltage value corresponding to the voltage feedback signal.

Furthermore, the filter 130 determines the feedback voltage value based on reception of the duty cycle of the PWM signal. Details are described below.

For example, the feedback voltage value corresponding to the voltage feedback signal means that the voltage feedback signal is a voltage signal having a preset voltage value, and the voltage value of the voltage signal is the feedback voltage value. In another example, the voltage value and a ratio of the feedback voltage value are preset. In other words, the filters 130 and the power converter 110 determine a same feedback voltage value based on the voltage value of the feedback voltage value.

In one embodiment, the voltage feedback signal is a signal that carries indication information, and the indication information of a specific value of the feedback voltage value can be carried in the voltage feedback signal.

It should be noted that a relation between the voltage feedback signal and the feedback voltage value is merely exemplary. The filter 130 and the power converter 110 negotiate the feedback voltage value based on the voltage feedback signals.

In one embodiment, the adapter 100 includes various components of a power adapter in the related art. For example, the components are selected from one group consisting of a voltage divider, a control switch, a fuse protection device, and the combinations. In order to avoid repeated descriptions, detailed descriptions thereof are omitted here.

Figure 2:
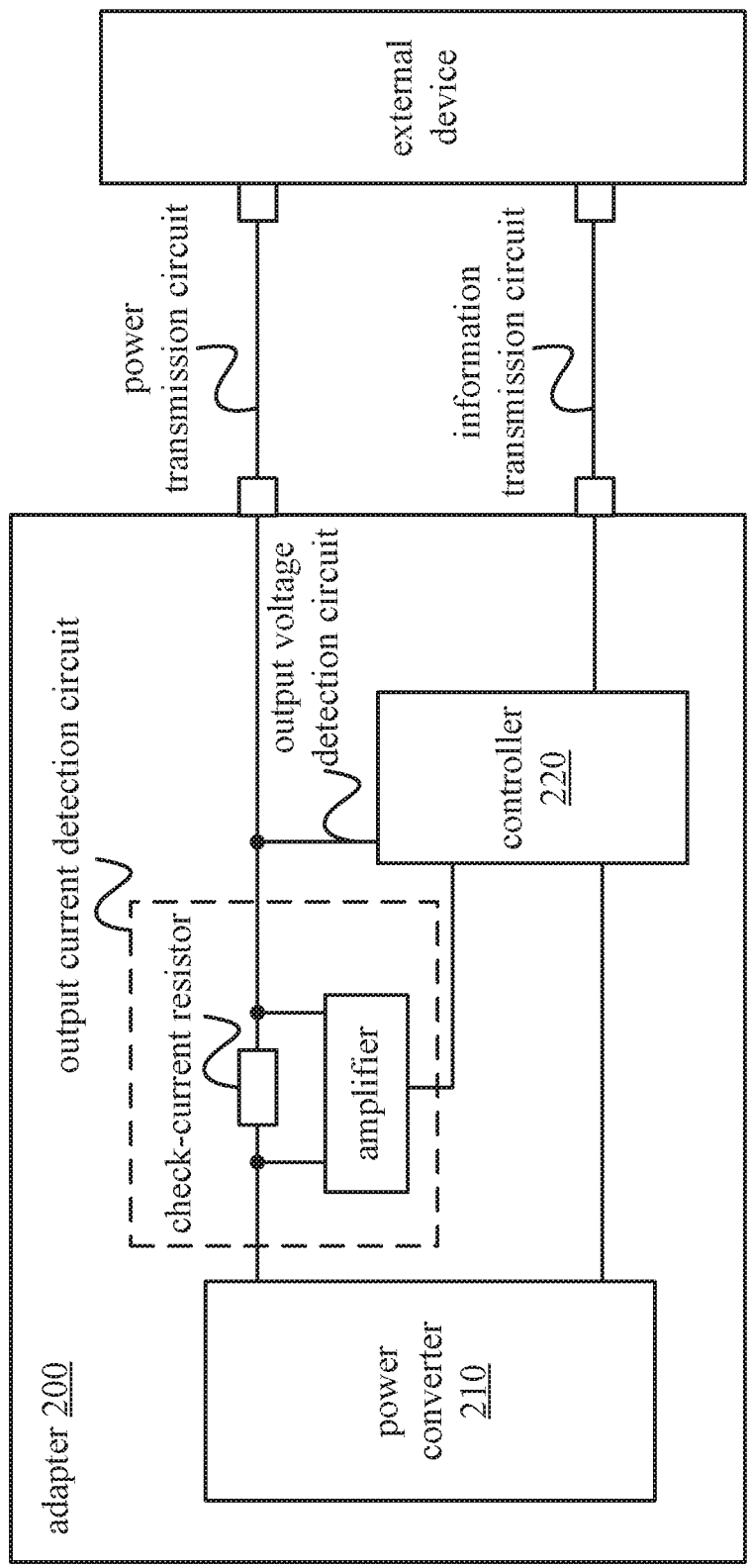
FIG. 2 is an illustrative structural diagram of the adapter for performing the charging method of controlling the output voltages according to another embodiment of the present disclosure.

FIG. 2 is an illustrative structural diagram of the adapter 200 for performing the charging method of controlling the output voltages according to another embodiment of the present disclosure.

As shown in FIG. 2, the adapter 200 includes following components.

A power converter 210 is configured to obtain an alternating current from a power source and converts the alternating current into a direct current.

A controller 220 is configured to generate a PWM signal based on a first adjustment strategy and first mapping relation and sends the PWM signal, such that the adjustment direction of the output voltage of the direct current of the power converter corresponds to the first adjustment strategy of at least two adjustment strategies. The first mapping relation is a one-to-one mapping relation between the at least two adjustment strategies and at least two duty cycles. Each of the adjustment strategies includes indication information of the adjustment direction of the output voltage of the power converter. The duty cycle of the PWM signal is one of the at least two duty cycles indicated by the first mapping relation and corresponds to the first adjustment strategy of the at least two adjustment strategies.

The controller 220 connects and communicates with the power converter 210.

A difference between the controller 220 and the controller 120 is that the controller 220 directly transmits the generated PWM signal to the power converter 210.

A difference between the power converter 210 and the power converter 110 is that the power converter 210 changes the output voltage based on the PWM signal from the controller 220. Details are described below.

In combination with FIG. 3 of the charging method 300 of controlling the output voltages according to one embodiment of the present disclosure. The components of the adapter will be described below. An action of the controller 120 or the controller 220 is similar to an action of the controller in the method 300 below. An action of the power converter 110 or the power converter 210 is similar to an action of a power converter in the method 300 below. An action of the filter 130 is similar to an action of the filter in the method 300 below.

FIG. 3 illustrates a schematic flowchart of the method 300 of controlling the output voltage based on the controller. As shown in FIG. 3, the method 300 includes following action blocks.

At block 310, the controller acquires first mapping relation that is one-to-one mapping relation between at least two adjustment strategies and at least two duty cycles. Each of the at least two adjustment strategies includes indication information of an adjustment direction of an output voltage of a power converter.

At block 320, the controller determines a first adjustment strategy.

At block 330, the controller generates a PWM signal based on the first adjustment strategy and the first mapping relation. The duty cycle of the PWM signal is one of the at least two duty cycles indicated by the first mapping relation and corresponds to the first adjustment strategy.

At block 340, the controller transmits the PWM signal, such that the adjustment direction of the output voltage of the power converter corresponds to the first adjustment strategy.

In detail, at the block 310, the controller obtains information (i.e., the first mapping relation) that is one-to-one mapping relation between a plurality of adjustment strategies and a plurality of duty cycles.

In embodiments of the present disclosure, a user inputs the first mapping relation to the controller. The first mapping relation can be preset in the controller by a manufacturer when the adapter or the controller is supplied from the factory. The first mapping relation can be also transmitted to the controller by an external device (e.g., a device to be charged) through the information transmission circuit.

At the block S320, the controller determines the adjustment strategy (e.g., the first adjustment strategy) corresponding to the adjustment process of the output voltage of the power converter in a next adjustment period (e.g., a first time interval).

A method of determining the first adjustment strategy by the controller is illustrated as follows.

For ease of understanding and descriptions, $I_0$ represents a present (i.e., before the first time interval) output current of the adapter (or the power converter). $I_1$ represents an adjusted (i.e., within the first time interval) output current of the adapter (or the power converter). $U_0$ represents a present (i.e., before the first time interval) output voltage of the adapter (or the power converter). $U_1$ represents an adjusted (i.e., within the first time interval) output voltage of the adapter (or the power converter).

Mode 1

In one embodiment, that the controller determines the first adjustment strategy includes the following actions.

The controller determines a target output current.

The controller determines a first output current, where the first output current is a current output by the power converter before a first time interval.

The controller determines the first adjustment strategy based on a difference between the first output current and a preset target output current. The first adjustment strategy is configured to adjust the output voltage of the power converter in the first time interval such that the output current of the power converter in the first time interval approaches the target output current.

In detail, as shown in FIG. 1 and FIG. 2, if the adapter includes the output current detection circuit, the controller determines the output current $I_0$ (e.g., a first output current) of the adapter (or the power converter) based on the output current detection circuit before the next adjustment period (e.g., before the first time interval).

For example, if the external device uses a constant current charging, the controller determines a target current (termed as $I_d$) based on a requirement of charging current (e.g., external device requests or prescribed protocols). The controller 120 further determines the first adjustment strategy according to a difference of a first output current and the target current.

In one embodiment, the electrical load is constant (i.e., a constant resistance of the external device).

For example, if the first output current $I_0$ is less than the target current $I_d$, the controller determines that the first adjustment strategy slightly increases the output voltage. In at least one embodiment, if the first output current $I_0$ is less than the target current $I_d$, the controller determines a specific increment value by which the output voltage needs to be increased based on the difference between the first output current $I_0$ and the target current $I_d$. Thus, the first adjustment strategy is a request of the increment value (termed as $\Delta U$) of the output voltage such that the adjusted output voltage $U_1$ is equal to or approaches the voltage ($U_0+\Delta U$). In another example, the controller determines a specific value to which the output voltage increases based on the target current $I_d$ and the electrical load of a charging circuit (e.g., resistance of the external device). Thus, the first adjustment strategy is the request of the specific value (termed as $U_2$) of the output voltage such that the adjusted output voltage $U_1$ is equal to or approaches the voltage $U_2$.

For example, if the first output current $I_0$ is greater than the target current $I_d$, the controller determines that the first adjustment strategy slightly decreases the output voltage. In at least one embodiment, if the first output current $I_0$ is greater than the target current $I_d$, the controller determines a specific decrement value by which the output voltage needs to be decreased based on the difference between the first output current $I_0$ and the target current $I_d$. Thus, the first adjustment strategy is a request of the decrement value (termed as $\Delta U'$) of the output voltage such that the adjusted output voltage $U_1$ is equal to or approaches the voltage ($U_0-\Delta U'$). In another example, the controller determines a specific value to which the output voltage decreases based on the target current $I_d$ and the electrical load of a charging circuit (e.g., resistance of the external device). Thus, the first adjustment strategy is the request of the specific value (termed as $U_2'$) of the output voltage such that the adjusted output voltage $U_1$ is equal to or approaches the voltage $U_2'$.

Mode 2

In one embodiment, that the controller determines the first adjustment strategy includes the following actions.

The controller determines a target output voltage.

The controller determines a first output voltage, where the first output voltage is a voltage output by the power converter before a first time interval.

The controller determines the first adjustment strategy based on a difference between the first output voltage and a preset target output voltage. The first adjustment strategy is configured to adjust the output voltage of the power converter in the first time interval such that the output voltage of the power converter in the first time interval approaches the target output voltage.

In detail, as shown in FIG. 1 or FIG. 2, if the adapter includes the output voltage detection circuit, the controller determines the output voltage $U_0$ (e.g., a first output voltage) of the adapter (or the power converter 110) based on the output voltage detection circuit before the next adjustment period (e.g., before the first time interval).

For example, if a constant voltage charging is used in the external device, the controller determines a target voltage (termed as $U_d$) based on a requirement of charging voltage (e.g., external device requests or prescribed protocols). The controller further determines the first adjustment strategy according to a difference of a first output voltage and the target voltage.

For example, if the first output voltage $U_0$ is less than the target voltage $U_d$, the controller determines that the first adjustment strategy slightly increases the output voltage. In at least one embodiment, if the first output voltage $U_0$ is less than the target voltage $U_d$, the controller determines a specific increment value by which the output voltage needs to be increased based on the difference between the first output voltage $U_0$ and the target voltage $U_d$. Thus, the first adjustment strategy is the need of the increment value (termed as $\Delta U''$) of the output voltage such that the adjusted output voltage $U_1$ is equal to or approaches the voltage $(U_0+\Delta U'')$. In another example, the controller serves the target voltage $U_d$ as a specific value to which the output voltage increases. Thus, the first adjustment strategy is the need of the specific value (termed as $U_d$) of the output voltage such that the adjusted output voltage $U_1$ is equal to or approaches the voltage $U_d$.

For example, if the first output voltage $U_0$ is greater than the target voltage $U_d$, the controller determines that the first adjustment strategy slightly decreases the output voltage. In at least one embodiment, if the first output voltage $U_0$ is greater than the target voltage $U_d$, the controller determines a specific decrement value by which the output voltage needs to be decreased based on the difference between the first output voltage $U_0$ and the target voltage $U_d$. Thus, the first adjustment strategy is the need of the decrement value (termed as $\Delta U'''$) of the output voltage such that the adjusted output voltage $U_1$ is equal to or approaches the voltage $(U_0-\Delta U''')$. In another example, the controller serves the target voltage $U_d$ as a specific value to which the output voltage decreases. Thus, the first adjustment strategy is the need of the specific value (termed as $U_d$) of the output voltage such that the adjusted output voltage $U_1$ is equal to or approaches the voltage $U_d$.

Mode 3

In one embodiment, that the controller determines the first adjustment strategy includes the following actions.

The controller receives control information transmitted by an external device. The external device receives the output voltage and the control information is configured to determine the first adjustment strategy.

The controller determines the first adjustment strategy based on the control information.

In detail, as shown in FIG. 1 and FIG. 2, if the adapter includes information transmission circuit, the controller receives control information from the external device based on the information transmission circuit, and determines the first adjustment strategy based on the control information.

In an embodiment, the control information is selected from one group consisting of indication information of a current value of charging current from the external device, indication information of a voltage value of direct current voltage from the external device, indication information of a current value of charging current expected by the external device, indication information of a voltage value of the charging current from the external device, indication information of a battery temperature of the external device, and indication information of a battery power level of the external device.

It should be understood that the information in the above-listed control information is merely exemplary, and other indication information for determining parameters of the control strategy falls within the scope of the present disclosure. The method of determining the adjustment strategy based on the control information can also be similar to related art. In order to avoid repeated descriptions, detailed descriptions thereof are omitted here.

Mode 4

In an embodiment, the controller determines a safe voltage range based on user devices or protocols.

Thus, the controller determines the first adjustment strategy based on the safe voltage range, such that the first adjustment strategy satisfies the safe voltage range. The adjusted output voltage based on the first adjustment strategy is within the safe voltage range.

For example, if the adapter includes the output voltage detection circuit, the controller detects the output voltage (e.g., the first output voltage) of the adapter (or the power converter) before a next adjustment period (e.g., before the first time interval) through the output voltage detection circuit. The controller determines the first adjustment strategy based on a difference between the detected first output voltage and the safe voltage range. For example, if the first output voltage is greater than a maximum value of the safe voltage range, the controller determines that the first adjustment strategy slightly decreases the output voltage.

Mode 5

In an embodiment, the controller determines a safe current range based on user devices or protocols.

Thus, the controller determines the first adjustment strategy based on the safe current range, such that the first adjustment strategy satisfies the safe current range. The adjusted output current based on the first adjustment strategy is within the safe current range.

For example, if the adapter includes the output current detection circuit, the controller detects the output current (e.g., the first output current) of the adapter (or the power converter) before a next adjustment period (e.g., before the first time interval) through the output current detection circuit. The controller determines the first adjustment strategy based on a difference between the detected first output current and the safe current range. For example, if the first output current is greater than a maximum value of the safe current range, the controller determines that the first adjustment strategy slightly decreases the output voltage.

It should be understood that the method of determining the first adjustment strategy by the controller listed above is merely exemplary, and other adjustment strategies of determining the output voltage falls within the scope of the present disclosure.

The method of determining the first adjusting strategy can be used independently or in combination, and the method is not particularly limited.

At the block S330, based on the first adjustment strategy in the block S320, the controller inquires the first mapping relation at the block S310, and determines a duty cycle (termed as a first duty cycle) corresponding to the first adjustment strategy.

Furthermore, the controller generates the PWM signal (termed as a first PWM signal) having the first duty cycle.

Therefore, the first PWM signal (e.g., the first duty cycle) is the determined first adjustment strategy.

At the block S340, the controller transmits the first PWM signal.

In an embodiment, that the controller transmits the first PWM signal includes the following action.

A pin of the controller transmits the first PWM signal.

In detail, since the first PWM signal is a pulse signal, a pin of the controller transmits the first PWM signal.

In embodiments of the present disclosure, when the adapter includes the structure of FIG. 1, the controller transmits the first PWM signal to the filter (i.e., Case A). When the adapter includes the structure shown in FIG. 2, the controller transmits the first PWM signal to the power converter (i.e., Case B). The processes of adjusting the output voltage of the power converter in two above-mentioned cases are described in detail below.

Case A

In one embodiment, that the controller transmits the PWM signal includes following actions.

The controller transmits the PWM signal to a filter such that the filter, based on the PWM signal and second mapping relation, the controller generates and transmit a voltage feedback signal to the power converter. The second mapping relation is a one-to-one mapping relation between the at least two duty cycles and at least two feedback voltage values. The voltage feedback values carried by the voltage feedback signal are defined as voltage values corresponding to the duty cycles of the PWM signal and indicated by the second mapping relation.

In detail, the filter obtains information (i.e., the second mapping relation) that is one-to-one mapping relation between the feedback voltage values and duty cycles.

In embodiments of the present disclosure, a user inputs the second mapping relation to the filter. For example, the second mapping relation can be preset in the filter by manufacturers when the adapter or the controller is supplied from the factory. In another example, the controller transmits the second mapping relation to the filter.

It should be noted that based on a same duty cycle, an adjustment strategy is mapped to a feedback voltage value. For example, if the adjustment strategy corresponding to a duty cycle A is an adjustment strategy A, and if the feedback voltage value corresponding to the duty cycle A is an feedback voltage value A, the adjusted output voltage based on the feedback voltage value A by the power converter is the same as or similar to the adjusted output voltage based on the adjustment strategy A.

For example, if the adjustment strategy A indicates that the output voltage is increased by a preset voltage interval, the power converter adjusts and increases the output voltage based on the preset voltage interval after receiving the feedback voltage value A.

Figure 4:
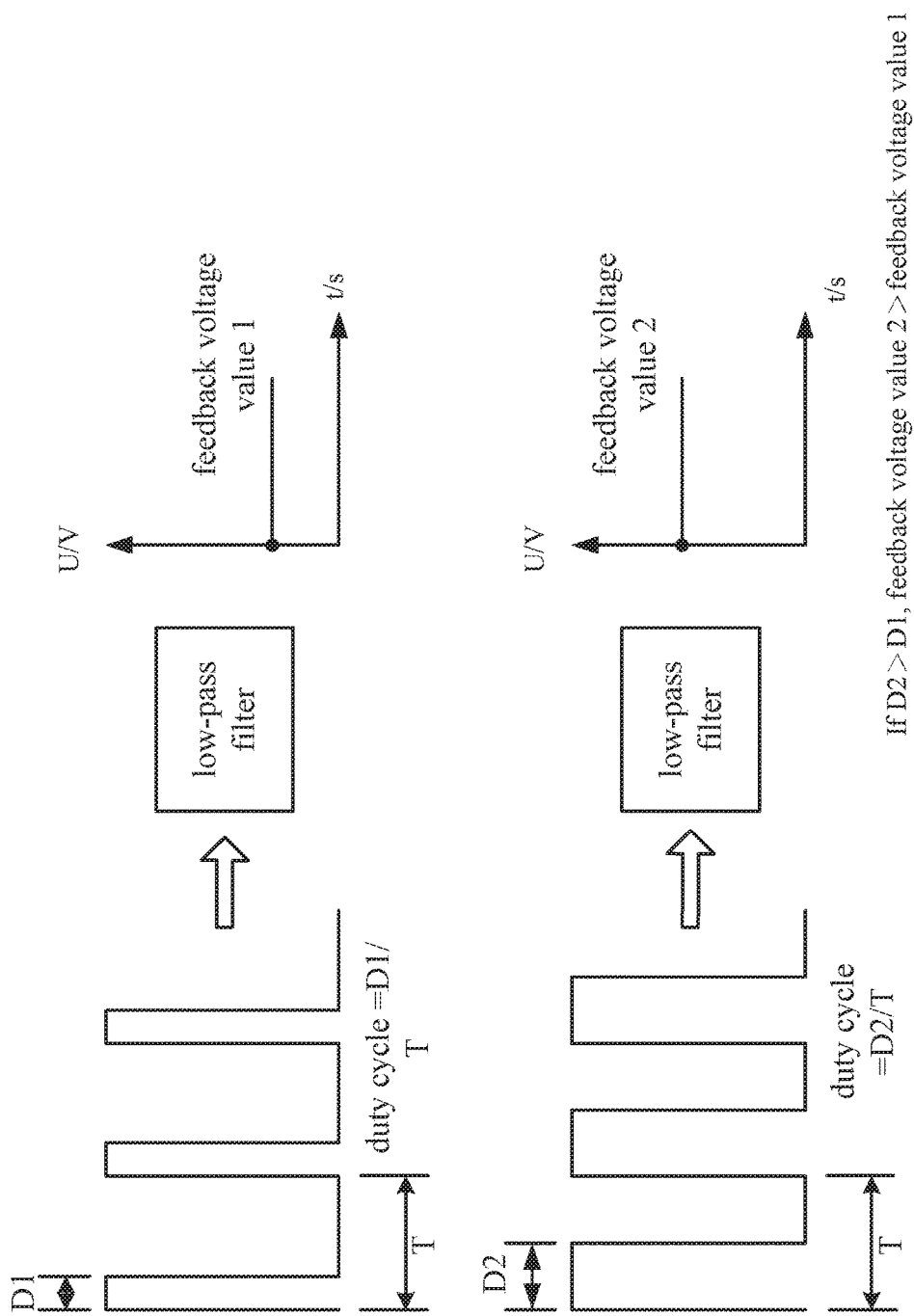
FIG. 4 is an illustrative diagram of a mapping relation between duty cycles and feedback voltage values according to one embodiment of the present disclosure.

FIG. 4 is an illustrative diagram of a mapping relation between duty cycles and feedback voltage values according to one embodiment of the present disclosure. As shown in FIG. 4, the second mapping relation means that larger duty cycles represent increased feedback voltage values.

It should be noted that the mapping relation between the duty cycles and feedback voltage values as mentioned above is merely exemplary.

Thus, when the filter receives the first PWM signal, the second mapping relation is inquired based on the duty cycle (i.e., the first duty cycle) of the first PWM signal such that the feedback voltage value (termed as the first feedback voltage value) corresponding to the first duty cycle is determined.

Furthermore, the filter is configured to generate the voltage feedback signal (termed as the first voltage feedback signal) corresponding to the first feedback voltage value.

The filter then transmits the first voltage feedback signal to the power converter.

After the power converter receives the first voltage feedback signal, the feedback voltage value (i.e., the first feedback voltage value) corresponding to the first voltage feedback signal is identified and thus, adjusting the output voltage according to the first feedback voltage value.

Case B

In an embodiment, that the controller transmits the PWM signal includes following actions.

The controller transmits the PWM signal to the power converter, such that the power determines the first adjustment strategy based on the PWM signal and the first mapping relation and adjusts the voltage based on the first adjustment strategy.

In detail, the power converter obtains information (i.e., the first mapping relation) that is one-to-one mapping relation between the adjustment strategies and duty cycles.

In embodiments of the present disclosure, a user inputs the first mapping relation to the power converter. For example, the first mapping relation can be preset in power converter by manufacturers when the adapter or the controller is supplied from the factory. In another example, the controller transmits the first mapping relation to the power converter.

For example, when the power converter receives the first PWM signal, the first mapping relation is inquired based on the duty cycle (i.e., the first duty cycle) of the first PWM signal, such that the adjustment strategy (termed as the first adjustment strategy) corresponding to the first duty cycle is determined and thus, adjusting the output voltage according to the first adjustment strategy.

For example, the power converter obtains information (i.e., the second mapping relation) that is one-to-one mapping relation between the adjustment strategies and duty cycles. In embodiments of the present disclosure, a user inputs the second mapping relation to the power converter. For example, the second mapping relation can be preset in power converter by manufacturers when the adapter or the controller is supplied from the factory. In another example, the controller transmits the second mapping relation to the power converter. It should be noted that based on a same duty cycle, an adjustment strategy is mapped to a feedback voltage value. For example, if the adjustment strategy corresponding to a duty cycle A is an adjustment strategy A, and if the feedback voltage value corresponding to the duty cycle A is an feedback voltage value A, the adjusted output voltage based on the feedback voltage value A by the power converter is the same as or similar to the adjusted output voltage based on the adjustment strategy A. For example, if the adjustment strategy A indicates that the output voltage is increased by a preset voltage interval, the power converter adjusts and increases the output voltage based on the preset voltage interval after receiving the feedback voltage value A. Therefore, when the power converter receives the first PWM signal, the second mapping relation is inquired based on the duty cycle (i.e., the first duty cycle) of the first PWM signal, such that the feedback voltage value (termed as the first feedback voltage value) corresponding to the first duty cycle is determined and thus, adjusting the output voltage according to the first feedback voltage value.

In a charging method of controlling output voltages according to one embodiment of the present disclosure, the controller generates a PWM signal corresponding to the duty cycles and the first adjustment strategy and controls the power converter that adjusts the output voltage by the PWM signal. Since a pin transmits the PWM signal, the pins of the controller are reduced and the use efficiency of the controller is increased. Moreover, since the duty cycle of the PWM signal is used to determine the first adjustment strategy, therefore, the output voltage of the power converter can be controlled only by identifying the duty cycle of the PWM signal, such that manufacturing cost can be reduced without a digital potentiometer with relatively higher cost in the related art.

FIG. 5 is an illustrative flowchart of the charging method 400 of controlling the output voltages according to another embodiment of the present disclosure. As shown in FIG. 5, the method 400 includes the following action blocks.

At block S410, a controller acquires second mapping relation that is one-to-one mapping relation between at least two duty cycles and at least two feedback voltage values.

At block S420, a filter receives a PWM signal transmitted by the controller, where the controller determines the PWM signal based on a first adjustment strategy and first mapping relation. The first mapping relation is a one-to-one mapping relation between at least two adjustment strategies and at least two duty cycles, where the at least two adjustment strategies includes the first adjustment strategy. Each of the at least two adjustment strategies includes indication information of an adjustment direction of an output voltage of a power converter. The duty cycle of the PWM signal is one of the at least two duty cycles indicated by the first mapping relation and corresponds to the first adjustment strategy.

At block S430, the filter generates a voltage feedback signal based on the PWM signal and the second mapping relation. Each of the at least two feedback voltage values corresponding to the voltage feedback signal is a voltage value indicated by the second mapping relation and corresponds to the duty cycle of the PWM signal.

At block S440, the filter transmits the voltage feedback signal to the power converter such that the power converter adjusts the output voltage based on the voltage feedback signal.

In an embodiment, that the filter receives the PWM signal transmitted by the controller includes the following actions.

A pin of the filter is configured to receive the first PWM signal transmitted by the controller.

A structure of the filter in the method 400 is similar to the filter 130 in FIG. 1. Operations of the filter in the method 400 are similar to the operations of the filter in the method 300. In order to avoid repeated descriptions, detailed descriptions thereof are omitted here.

In a charging method of controlling output voltages according to one embodiment of the present disclosure, the controller generates a PWM signal corresponding to the duty cycles and the first adjustment strategy and controls the power converter that adjusts the output voltage by the PWM signal. Since a pin transmits the PWM signal, the pins of the controller are reduced and the use efficiency of the controller is increased. Moreover, since the duty cycle of the PWM signal is used to determine the first adjustment strategy, therefore, the output voltage of the power converter can be controlled only by identifying the duty cycle of the PWM signal, such that manufacturing cost can be reduced without a digital potentiometer with relatively higher cost in the related art.

FIG. 6 is yet another illustrative flowchart of the charging method 500 of controlling the output voltages according to another embodiment of the present disclosure. As shown in FIG. 6, the method 500 includes the following action blocks.

At block S510, a power converter acquires first mapping relation that is one-to-one mapping relation between at least two adjustment strategies and at least two duty cycles. Each of the at least two adjustment strategies includes indication information of an adjustment direction of an output voltage of a power converter.

At block S520, the power converter receives a PWM signal transmitted by a controller, wherein the controller determines the PWM signal based on the first adjustment strategy and the first mapping relation. The duty cycle of the PWM signal is one of the at least two duty cycles indicated by the first mapping relation and corresponds to the first adjustment strategy.

At block S530, the power converter determines the first adjustment strategy based on the PWM signal and the first mapping relation.

At block S540, the power converter adjusts the output voltage based on the first adjustment strategy.

In an embodiment, that the power converter receives the PWM signal transmitted by the controller includes the following actions.

A pin of the power converter is configured to receive the first PWM signal transmitted by the controller.

In an embodiment, each of the at least two adjustment strategies further includes indication information of an adjustment amplitude of the output voltage.

A structure of the power converter in the method 500 is similar to the power converter 210 in FIG. 2. Operations of the power converter in the method 300 are similar to the operations (e.g., the operations of Case B) of the power converter in the method 300. In order to avoid repeated descriptions, detailed descriptions thereof are omitted here.

In a charging method of controlling output voltages according to one embodiment of the present disclosure, the controller generates a PWM signal corresponding to the duty cycles and the first adjustment strategy, and controls the power converter that adjusts the output voltage by the PWM signal. Since a pin transmits the PWM signal, the pins of the controller are reduced and the use efficiency of the controller is increased. Moreover, since the duty cycle of the PWM signal is used to determine the first adjustment strategy, therefore, the output voltage of the power converter can be controlled only by identifying the duty cycle of the PWM signal, such that manufacturing cost can be reduced without a digital potentiometer with relatively higher cost in the related art.

The method of controlling the output voltages according to the embodiments of the present disclosure is described with reference to FIGS. 1-6. An apparatus of controlling the output voltages according to the embodiments of the present disclosure is described in combination with FIGS. 7-9. The apparatus can be a part of a mobile terminal or an electronic device. The apparatus also can be an entire mobile terminal or an entire other electronic device with function of charging method. In embodiments of the present disclosure, each of the apparatus and adapter includes a processor and a memory, wherein the memory is configured to store executable program instructions, the processor is configured to execute the executable program instructions performing corresponding operations in FIGS. 1-6.

Figure 7:
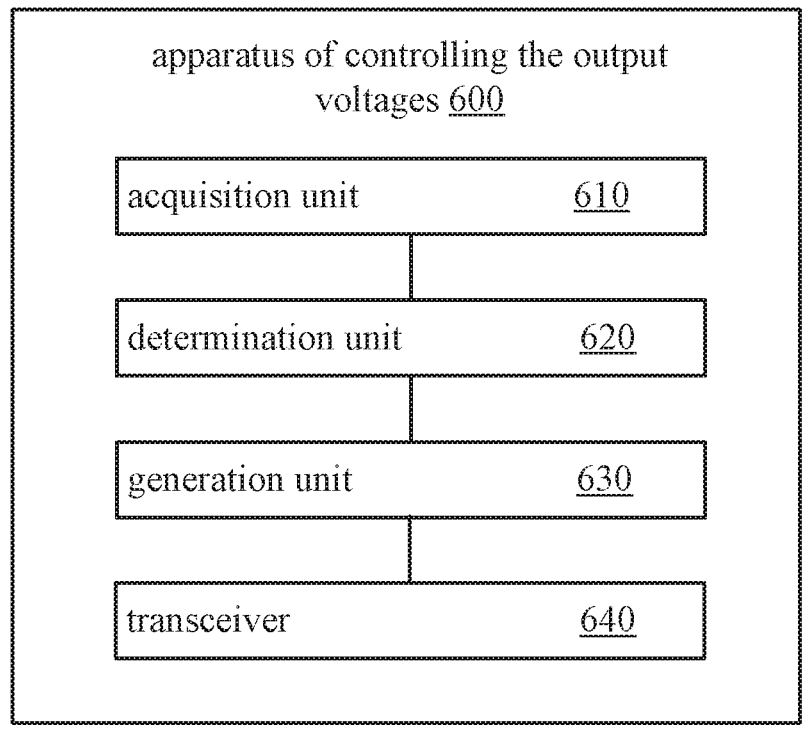
FIG. 7 is an illustrative structural diagram of an apparatus of controlling the output voltages according to one embodiment of the present disclosure.

FIG. 7 is an illustrative structural diagram of the apparatus 600 of controlling the output voltages according to one embodiment of the present disclosure. As shown in FIG. 7, the apparatus 600 includes the following components.

An acquisition unit 610 is configured to acquire first mapping relation that is one-to-one mapping relation between at least two adjustment strategies and at least two duty cycles. Each of the at least two adjustment strategies includes indication information of an adjustment direction of an output voltage of a power converter.

A determination unit 620 is configured to determine a first adjustment strategy.

A generation unit 630 is configured to generate a PWM signal based on the first adjustment strategy and the first mapping relation. The duty cycle of the PWM signal is one of the at least two duty cycles indicated by the first mapping relation and corresponds to the first adjustment strategy.

A transceiver 640 is configured to transmit the PWM signal, such that the adjustment direction of the output voltage of the power converter corresponds to the first adjustment strategy.

In one embodiment, the transceiver 640 is configured to transmit the PWM signal by a pin.

In one embodiment, the transceiver 640 is configured to transmit the PWM signal to a filter such that the filter, based on the PWM signal and second mapping relation, generates a voltage feedback signal and transmits the voltage feedback signal to the power converter. The second mapping relation is a one-to-one mapping relation between the at least two duty cycles and at least two feedback voltage values. Each of the at least two feedback voltage values corresponding to the voltage feedback signal is a voltage value indicated by the second mapping relation and corresponds to the duty cycle of the PWM signal.

In one embodiment, the transceiver 640 is configured to transmit the PWM signal to the power converter such that the power converter, based on the PWM signal and the first mapping relation, determines the first adjustment strategy and adjusts the output voltage based on the first adjustment strategy.

In one embodiment, each of the adjustment strategies further includes indication information of an adjustment amplitude of the output voltage of the power converter.

In one embodiment, the transceiver 640 is configured to receive control information transmitted by an external device. The external device receives the output voltage and the control information is configured to determine the first adjustment strategy.

The determination unit 620 is configured to determine the first adjustment strategy based on the control information.

In one embodiment, the determination unit 620 is configured to determine a target output voltage.

The determination unit 620 is configured to determine a first output voltage, where the first output voltage is a voltage output by the power converter before a first time interval The determination unit 620 is configured to determine the first adjustment strategy based a difference between the first output voltage and a preset target output voltage. The first adjustment strategy is configured to adjust the output voltage of the power converter in the first time interval such that the output voltage of the power converter in the first time interval approaches the target output voltage.

In the embodiments of the present disclosure, the apparatus 600 of controlling the output voltages can be embedded in or self-used as an adapter. The apparatus 600 corresponds to a controller in an embodiment of the present disclosure. Units, operations and functions in the apparatus 600 are used for performing corresponding actions of the method 300 in FIG. 3. For the sake of brevity, descriptions are not repeated herein.

In a charging apparatus of controlling output voltages according to one embodiment of the present disclosure, the controller generates a PWM signal corresponding to the duty cycles and the first adjustment strategy, and controls the power converter that adjusts the output voltage by the PWM signal. Since a pin transmits the PWM signal, the pins of the controller are reduced and the use efficiency of the controller is increased. Moreover, since the duty cycle of the PWM signal is used to determine the first adjustment strategy, therefore, the output voltage of the power converter can be controlled only by identifying the duty cycle of the PWM signal, such that manufacturing cost can be reduced without a digital potentiometer with relatively higher cost in the related art.

Figure 8:
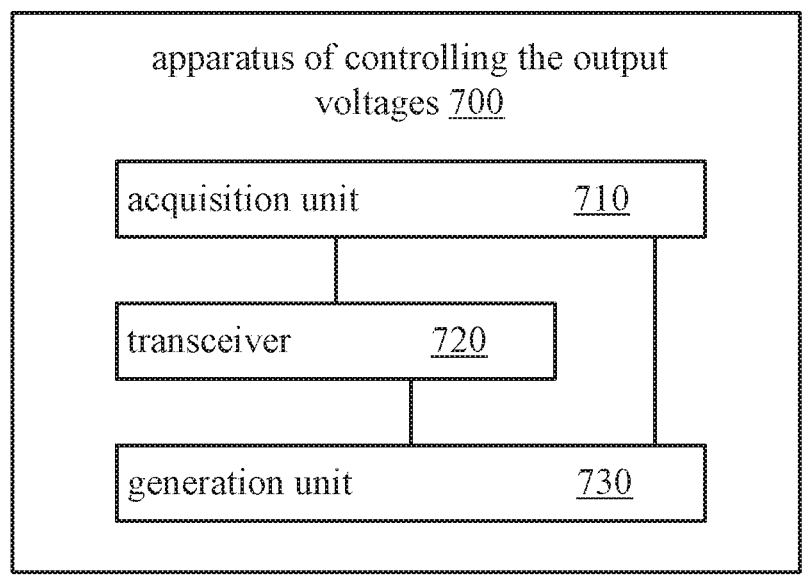
FIG. 8 is an illustrative structural diagram of the apparatus of controlling the output voltages according to another embodiment of the present disclosure.

FIG. 8 is an illustrative structural diagram of the apparatus 700 of controlling the output voltages according to another embodiment of the present disclosure. As shown in FIG. 8, the apparatus 700 includes the following components.

An acquisition unit 700 is configured to acquire second mapping relation that is one-to-one mapping relation between at least two duty cycles and at least two feedback voltage values.

A transceiver 720 is configured to receive a PWM signal transmitted by the controller, where the controller determines the PWM signal based on the first adjustment strategy and first mapping relation. The first mapping relation is a one-to-one mapping relation between at least two adjustment strategies and at least two duty cycles, where the at least two adjustment strategies includes the first adjustment strategy. Each of the adjustment strategies includes indication information of an adjustment direction of an output voltage of a power converter. The duty cycle of the PWM signal is one of the at least two duty cycles indicated by the first mapping relation and corresponds to the first adjustment strategy.

A generation unit 730 is configured to generate a voltage feedback signal based on the PWM signal and the second mapping relation. Each of the at least two feedback voltage values corresponding to the voltage feedback signal is a voltage value indicated by the second mapping relation and corresponds to the duty cycle of the PWM signal.

The transceiver 720 is configured to transmit the voltage feedback signal to the power converter such that the power converter adjusts the output voltage based on the voltage feedback signal.

In one embodiment, a pin of the transceiver 720 is configured to receive the PWM signal transmitted by the controller.

In the embodiments of the present disclosure, the apparatus 700 of controlling the output voltages can be embedded in or self-used as an adapter. The apparatus 700 corresponds to a controller in an embodiment of the present disclosure. Units, operations and functions in the apparatus 700 are used for performing corresponding actions of the method 400 in FIG. 5. For the sake of brevity, descriptions are not repeated herein.

In a charging apparatus of controlling output voltages according to one embodiment of the present disclosure, the controller generates a PWM signal corresponding to the duty cycles and the first adjustment strategy, and controls the power converter that adjusts the output voltage by the PWM signal. Since a pin transmits the PWM signal, the pins of the controller are reduced and the use efficiency of the controller is increased. Moreover, since the duty cycle of the PWM signal is used to determine the first adjustment strategy, therefore, the output voltage of the power converter can be controlled only by identifying the duty cycle of the PWM signal, such that manufacturing cost can be reduced without a digital potentiometer with relatively higher cost in the related art.

Figure 9:
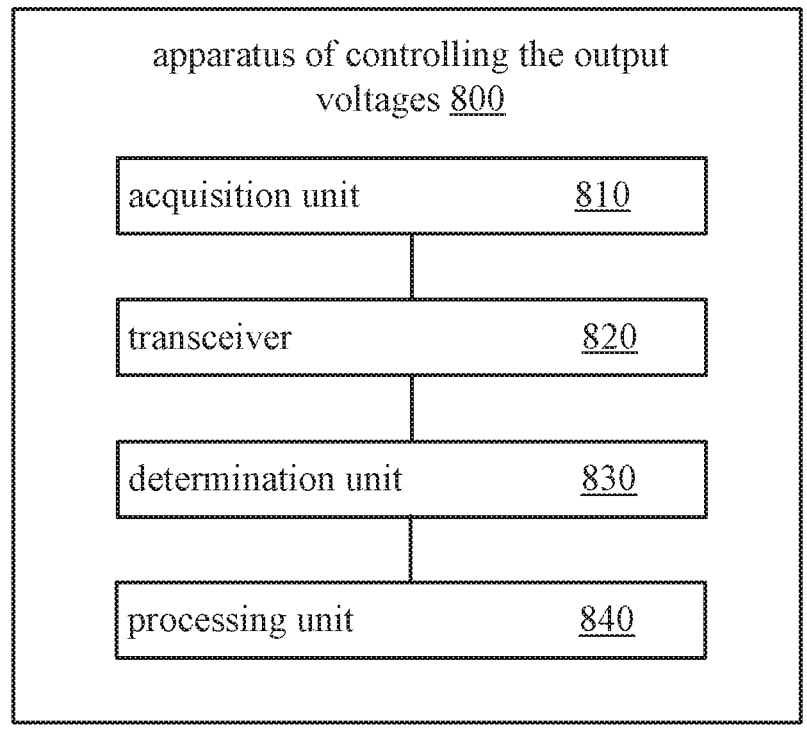
FIG. 9 is yet another illustrative structural diagram of the apparatus of controlling the output voltages according to another embodiment of the present disclosure.

FIG. 9 is yet another illustrative structural diagram of the apparatus 800 of controlling the output voltages according to another embodiment of the present disclosure. As shown in FIG. 9, the apparatus 800 includes the following components.

An acquisition unit 810 is configured to acquire first mapping relation that is one-to-one mapping relation between at least two adjustment strategies and at least two duty cycles. Each of the adjustment strategies includes indication information of an adjustment direction of an output voltage of a power converter.

A transceiver 820 is configured to receive a PWM signal transmitted by a controller, where the controller determines the PWM signal based on the first adjustment strategy and first mapping relation. The duty cycle of the PWM signal is one of the at least two duty cycles indicated by the first mapping relation and corresponds to the first adjustment strategy.

A determination unit 830 is configured to determine the first adjustment strategy based on the PWM signal and the first mapping relation.

A processing unit 840 is configured to adjust the output voltage based on the first adjustment strategy.

In one embodiment, a pin of the transceiver 820 is configured to receive the PWM signal transmitted by the controller.

In one embodiment, each of the adjustment strategies further includes indication information of an adjustment amplitude of the output voltage.

In the embodiments of the present disclosure, the apparatus 800 of controlling the output voltages can be embedded in or self-used as an adapter. The apparatus 800 corresponds to a controller in an embodiment of the present disclosure. Units, operations and functions in the apparatus 800 are used for performing corresponding actions of the method 500 in FIG. 6. For the sake of brevity, descriptions are not repeated herein.

In a charging apparatus of controlling output voltages according to one embodiment of the present disclosure, the controller generates a PWM signal corresponding to the duty cycles and the first adjustment strategy, and controls the power converter that adjusts the output voltage by the PWM signal. Since a pin transmits the PWM signal, the pins of the controller are reduced and the use efficiency of the controller is increased. Moreover, since the duty cycle of the PWM signal is used to determine the first adjustment strategy, therefore, the output voltage of the power converter can be controlled only by identifying the duty cycle of the PWM signal, such that manufacturing cost can be reduced without a digital potentiometer with relatively higher cost in the related art.

Figure 10:
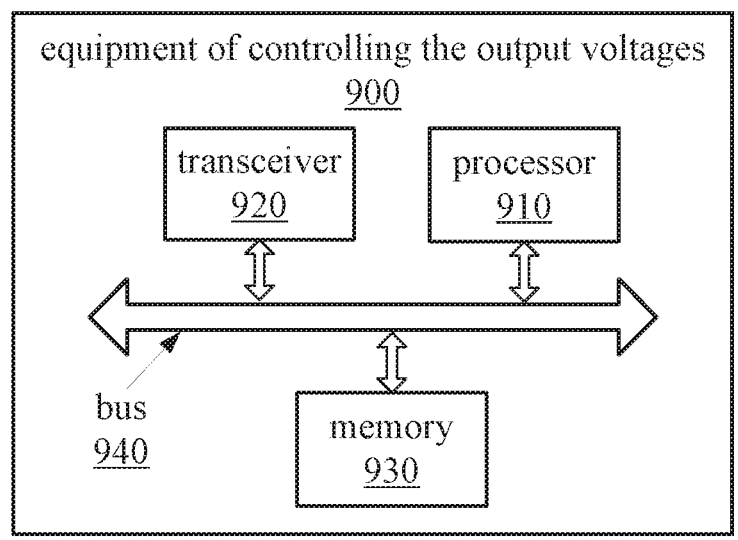
FIG. 10 is an illustrative block diagram of an equipment of controlling the output voltages according to one embodiment of the present disclosure.

FIG. 10 is an illustrative block diagram of an equipment 900 of controlling the output voltages according to one embodiment of the present disclosure. As shown in FIG. 10, the equipment 900 includes a processor 910 and a transceiver 920. The processor 910 is connected to the transceiver 920. In one embodiment, the equipment 900 further includes a memory 930 connected to the processor 910. The equipment 900 further includes a bus 940 that connects the processor 910, the transceiver 920, and the memory 930 each other. The memory 930 is configured to store executable program instructions. The processor 910 is configured to execute the executable program instructions in the memory 930 and controls information or signals transmitted by the transceiver 920.

The processor 910 is configured to acquire first mapping relation that is one-to-one mapping relation between at least two adjustment strategies and at least two duty cycles. Each of the at least two adjustment strategies includes indication information of an adjustment direction of an output voltage of a power converter.

The processor 910 is configured to determine a first adjustment strategy.

The processor 910 is configured to generate a PWM signal based on the first adjustment strategy and the first mapping relation. The duty cycle of the PWM signal is one of the at least two duty cycles indicated by the first mapping relation and corresponds to the first adjustment strategy.

The processor 910 controls the transceiver 920 for transmitting the PWM signal, such that the adjustment direction of the output voltage of the power converter corresponds to the first adjustment strategy.

In one embodiment, the processor 910 controls the transceiver 920 and a pin of the transceiver 920 transmits the PWM signal.

In one embodiment, the processor 910 controls the transceiver 920 and the transceiver 920 transmits the PWM signal to a filter such that the filter, based on the PWM signal and second mapping relation, generates a voltage feedback signal and transmits the voltage feedback signal to the power converter. The second mapping relation is a one-to-one mapping relation between the at least two duty cycles and at least two feedback voltage values. Each of the at least two feedback voltage values corresponding to the voltage feedback signal is a voltage value indicated by the second mapping relation and corresponds to the duty cycle of the PWM signal.

In one embodiment, the processor 910 controls the transceiver 920 and the transceiver 920 transmits the PWM signal to the power converter such that the power converter, based on the PWM signal and the first mapping relation, determines the first adjustment strategy and adjusts the output voltage based on the first adjustment strategy.

In one embodiment, each of the adjustment strategies further includes indication information of an adjustment amplitude of the output voltage of the power converter.

In one embodiment, the processor 910 controls the transceiver 920 and the transceiver 920 receives control information transmitted by an external device. The external device receives the output voltage and the control information is configured to determine the first adjustment strategy.

The processor 910 is configured to determine the first adjustment strategy based on the control information.

In one embodiment, the processor 910 is configured to determine a target output voltage.

The processor 910 is configured to determine a first output voltage, where the first output voltage is a voltage output by the power converter before a first time interval The processor 910 is configured to determine the first adjustment strategy based a difference between the first output voltage and a preset target output voltage. The first adjustment strategy is configured to adjust the output voltage of the power converter in the first time interval such that the output voltage of the power converter in the first time interval approaches the target output voltage.

In the embodiments of the present disclosure, the apparatus 900 of controlling the output voltages can be embedded in or self-used as an adapter. The apparatus 900 corresponds to a controller in an embodiment of the present disclosure. Units, operations and functions in the apparatus 900 are used for performing corresponding actions of the method 300 in FIG. 3. For the sake of brevity, descriptions are not repeated herein.

In the equipment of controlling output voltages according to one embodiment of the present disclosure, the controller generates a PWM signal corresponding to the duty cycles and the first adjustment strategy, and controls the power converter that adjusts the output voltage by the PWM signal. Since a pin transmits the PWM signal, the pins of the controller are reduced and the use efficiency of the controller is increased. Moreover, since the duty cycle of the PWM signal is used to determine the first adjustment strategy, therefore, the output voltage of the power converter can be controlled only by identifying the duty cycle of the PWM signal, such that manufacturing cost can be reduced without a digital potentiometer with relatively higher cost in the related art.

Figure 11:
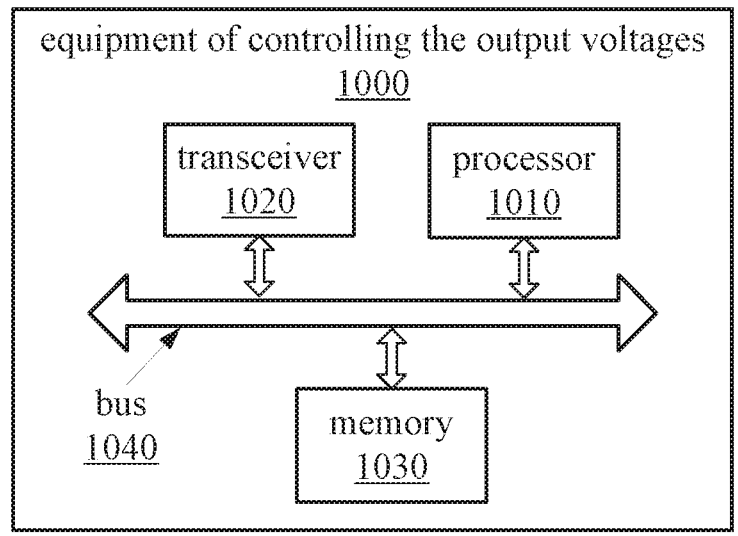
FIG. 11 is an illustrative block diagram of the equipment of controlling the output voltages according to another embodiment of the present disclosure.

FIG. 11 is an illustrative block diagram of the equipment 1000 of controlling the output voltages according to another embodiment of the present disclosure. As shown in FIG. 11, the equipment 1000 includes a processor 1010 and a transceiver 1020. The processor 1010 is connected to the transceiver 1020. In one embodiment, the equipment 1000 further includes a memory 1030 connected to the processor 1010. The equipment 1000 further includes a bus 1040 that connects the processor 1010, the transceiver 1020, and the memory 1030 each other. The memory 1030 is configured to store executable program instructions. The processor 1010 is configured to execute the executable program instructions in the memory 1030 and controls information or signals transmitted by the transceiver 1020.

The processor 1010 is configured to acquire second mapping relation that is one-to-one mapping relation between at least two duty cycles and at least two feedback voltage values.

The processor 1010 controls the transceiver 1020 for receiving a PWM signal transmitted by the controller, where the controller determines the PWM signal based on the first adjustment strategy and first mapping relation. The first mapping relation is a one-to-one mapping relation between at least two adjustment strategies and at least two duty cycles, where the at least two adjustment strategies includes the first adjustment strategy. Each of the adjustment strategies includes indication information of an adjustment direction of an output voltage of a power converter. The duty cycle of the PWM signal is one of the at least two duty cycles indicated by the first mapping relation and corresponds to the first adjustment strategy.

The processor 1010 is configured to generate a voltage feedback signal based on the PWM signal and the second mapping relation. Each of the at least two feedback voltage values corresponding to the voltage feedback signal is a voltage value indicated by the second mapping relation and corresponds to the duty cycle of the PWM signal.

The processor 1010 controls the transceiver 1020 for transmitting the voltage feedback signal to the power converter such that the power converter adjusts the output voltage based on the voltage feedback signal.

In one embodiment, the processor 1010 controls the transceiver 1020 such that a pin of the transceiver 1020 receives the PWM signal transmitted by the controller.

In the embodiments of the present disclosure, the equipment 1000 of controlling the output voltages can be embedded in or self-used as an adapter. The equipment 1000 corresponds to a controller in an embodiment of the present disclosure. Units, operations and functions in the equipment 1000 are used for performing corresponding actions of the method 400 in FIG. 5. For the sake of brevity, descriptions are not repeated herein.

In the equipment 1000 of controlling output voltages according to one embodiment of the present disclosure, the controller generates a PWM signal corresponding to the duty cycles and the first adjustment strategy, and controls the power converter that adjusts the output voltage by the PWM signal. Since a pin transmits the PWM signal, the pins of the controller are reduced and the use efficiency of the controller is increased. Moreover, since the duty cycle of the PWM signal is used to determine the first adjustment strategy, therefore, the output voltage of the power converter can be controlled only by identifying the duty cycle of the PWM signal, such that manufacturing cost can be reduced without a digital potentiometer with relatively higher cost in the related art.

Figure 12:
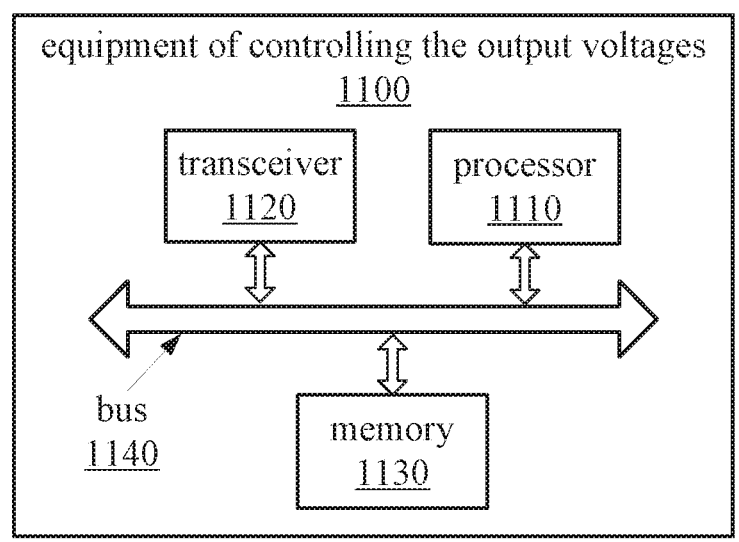
FIG. 12 is yet another illustrative block diagram of the equipment of controlling the output voltages according to another embodiment of the present disclosure.

FIG. 12 is yet another illustrative block diagram of the equipment 1100 of controlling the output voltages according to another embodiment of the present disclosure. As shown in FIG. 12, the equipment 1100 includes a processor 110 and a transceiver 1120. The processor 1110 is connected to the transceiver 1120. In one embodiment, the equipment 1100 further includes a memory 1130 connected to the processor 1110. The equipment 1100 further includes a bus 1140 that connects the processor 1110, the transceiver 1120, and the memory 1130 each other. The memory 1030 is configured to store executable program instructions. The processor 1110 is configured to execute the executable program instructions in the memory 1130 and controls information or signals transmitted by the transceiver 1120.

The processor 1110 is configured to acquire first mapping relation that is one-to-one mapping relation between at least two adjustment strategies and at least two duty cycles. Each of the adjustment strategies includes indication information of an adjustment direction of an output voltage of a power converter.

The processor 1110 controls the transceiver 820 for receiving a PWM signal transmitted by a controller, where the controller determines the PWM signal based on the first adjustment strategy and first mapping relation. The duty cycle of the PWM signal is one of the at least two duty cycles indicated by the first mapping relation and corresponds to the first adjustment strategy.

The processor 1110 is configured to determine the first adjustment strategy based on the PWM signal and the first mapping relation.

The processor 1110 is configured to adjust the output voltage based on the first adjustment strategy.

In one embodiment, the processor 1110 controls the transceiver 1120 such that a pin of the transceiver 1120 receives the PWM signal transmitted by the controller.

In one embodiment, each of the adjustment strategies further includes indication information of an adjustment amplitude of the output voltage.

In the embodiments of the present disclosure, the equipment 1100 of controlling the output voltages can be embedded in or self-used as an adapter. The equipment 1100 corresponds to a controller in an embodiment of the present disclosure. Units, operations and functions in the equipment 1100 are used for performing corresponding actions of the method 500 in FIG. 6. For the sake of brevity, descriptions are not repeated herein.

In a charging apparatus of controlling output voltages according to one embodiment of the present disclosure, the controller generates a PWM signal corresponding to the duty cycles and the first adjustment strategy, and controls the power converter that adjusts the output voltage by the PWM signal. Since a pin transmits the PWM signal, the pins of the controller are reduced and the use efficiency of the controller is increased. Moreover, since the duty cycle of the PWM signal is used to determine the first adjustment strategy, therefore, the output voltage of the power converter can be controlled only by identifying the duty cycle of the PWM signal, such that manufacturing cost can be reduced without a digital potentiometer with relatively higher cost in the related art.

It should be noted that the methods of the present disclosure can be applied to a processor or executed by a processor. The processor can be an integrated circuit chip and includes signal processing capability. In the implementation process, all actions of embodiments in the method are implemented by executable instructions of integrated logic circuits of hardware or software programs in the processor. The processor can be a general purpose processor, a digital signal processor (DSP), and an application specific integrated circuit (ASIC), a field programmable gate array (FPGA) or other programmable logic devices, discrete gates or transistor logic devices and discrete hardware components. The processor implements or executes methods, actions and logic blocks in the embodiments of the present disclosure. The general purpose processor can be a microprocessor or the processor can be any conventional processor.

The actions of the method disclosed by the embodiments of present disclosure can be embodied directly as a hardware decoding processor can be directly executed by a hardware decoding processor, or by combinations of hardware and software codes in a decoding processor. The software codes can be stored in a storage medium selected from one group consisting of random access memory, a flash memory, a read-only memory, a programmable read-only memory, an electrically erasable programmable memory, and registers. The processor read information (e.g., instructions) in the memory and completes the above-mentioned actions of the method in combination with hardware.

It should be noted that the memory is selected from one group consisting of a volatile memory, a nonvolatile memory and the combination. The volatile memory includes a read-only memory (ROM), a programmable read-only memory (PROM), an erasable programmable read-only memory (EPROM), an electrically erasable programmable read-only memory (EEPROM), and a flash memory. The nonvolatile memory includes a random access memory (RAM) that serves as an external cache. A number of RAM types include static RAM (SRAM), dynamic RAM (DRAM), synchronous DRAM (SDRAM), double data rate SDRAM (DDR SDRAM), enhanced SDRAM (ESDRAM), synchronous-link DRAM (SLDRAM), and direct Rambus RAM (DR RAM). It should be noted that the memories of the systems and methods described herein include, but are not limited to, any other suitable types of memory.

It should be understood that in various embodiments of the present disclosure, the sequence numbers of all the processes do not imply the execution sequence. The execution sequence of each process should be determined by the function and the internal logic of the process, and does not need to be limited by the implementation process of the embodiment of the present disclosure.

Persons skilled in the related art should be noted that the actions of all examples described by the embodiments disclosed in the present disclosure are combined and implemented by combining electronic hardware, computer software and electronic hardware. The functions executed by hardware or software depend on the specific application and design constraint conditions of the technical scheme. Professional technicians may use different methods for each particular application to achieve the described functions, but the implementations are not considered to be beyond the scope of the present disclosure.

Persons skilled in the related art should be noted that for the sake of convenience and brevity, operations of the system, devices and units can be referred to corresponding processes in the embodiments of the present disclosure and descriptions are not repeated herein.

In the embodiments of the present disclosure, it should be noted that the operations of the system, devices and units can be performed in other manners.

For example, the apparatus embodiments described above are merely exemplary. The division of the unit is only one logical function division, and in actual implementation, another division mode can be achieved. For example, a plurality of units or components may be combined or may be integrated into another system. A portion of features can be ignored or not executed. A mutual coupling or a direct coupling or communication connection can be achieved by interfaces. An indirect coupling or communication connection direct between device and units can be in an electrical, mechanical or other manner.

The units illustrated as separate components can be or cannot be physically separate. The component displayed as a unit can be or cannot be a physical unit. In other words, the component can be located in a place or distributed to a plurality of networks. Based on actual requirement, a part or all of the units can be selected to achieve the purpose of the scheme of the embodiments.

In addition, the functional units in various embodiments of the present disclosure can be integrated in a processing unit. The functional units also can be separate. Two or more units can be integrated in one unit.

If the functional unit is implemented in the form of a software functional unit and sold or used as an independent product, the functional unit can be stored in a computer readable storage medium. Based on such understanding, the technical scheme of the present disclosure is essentially the part which makes contributions to the related art or the part of the technical scheme and can be embodied in the form of computer software products. The computer software products are stored in a storage medium, and include a plurality of executable program instructions for enabling a computer device, such as a personal computer, a server, or network equipment, to execute all or part of the actions of the method disclosed by the embodiment of the present disclosure. The storage medium includes a USB flash disk, a mobile hard disk, ROM, RAM, a magnetic disk or an optical disk, and other media capable of storing program codes.

As is understood by a person skilled in the art, the foregoing preferred embodiments of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. A charging method of controlling output voltages, comprising:
acquiring, by a controller, first mapping relation that is a one-to-one mapping relation between at least two adjustment strategies and at least two duty cycles, wherein each of the at least two adjustment strategies comprises indication information of an adjustment direction of an output voltage of a power converter;
determining, by the controller, a first adjustment strategy;

generating, by the controller, a pulse width modulation (PWM) signal based on the first adjustment strategy and the first mapping relation, wherein a duty cycle of the PWM signal is one of the at least two duty cycles indicated by the first mapping relation and corresponds to the first adjustment strategy; and transmitting, by the controller, the PWM signal to a filter such that the filter, based on the PWM signal and second mapping relation, generates a voltage feedback signal and transmits the voltage feedback signal to the power converter, wherein the second mapping relation is a one-to-one mapping relation between the at least two duty cycles and at least two feedback voltage values, and each of the at least two feedback voltage values corresponding to the voltage feedback signal is a voltage value indicated by the second mapping relation and corresponds to the duty cycle of the PWM signal.

2. The charging method of controlling output voltages according to claim 1, wherein transmitting, by the controller, the PWM signal comprises:

transmitting, by a pin of the controller, the PWM signal.

3. The charging method of controlling output voltages according to claim 1, wherein each of the at least two adjustment strategies further comprises indication information of an adjustment amplitude of the output voltage of the power converter.

4. The charging method of controlling output voltages according to claim 1, wherein determining, by the controller, the first adjustment strategy comprises:

receiving, by the controller, control information transmitted by an external device, wherein the external device receives the output voltage and the control information is configured to determine the first adjustment strategy; and determining, by the controller, the first adjustment strategy based on the control information.

5. The charging method of controlling output voltages according to claim 1, wherein determining, by the controller, the first adjustment strategy comprises:

determining, by the controller, a target output voltage;

determining, by the controller, a first output voltage, wherein the first output voltage is a voltage output by the power converter before a first time interval; and determining, by the controller, the first adjustment strategy based on a difference between the first output voltage and a preset target output voltage, wherein the first adjustment strategy is configured to adjust the output voltage of the power converter in the first time interval, such that the output voltage of the power converter in the first time interval approaches the target output voltage.

6. A charging apparatus of controlling output voltages, comprising a processor and a memory, wherein the memory is configured to store executable program instructions; and the processor is configured to execute the executable program instructions performing following operations:

acquiring first mapping relation that is a one-to-one mapping relation between at least two adjustment strategies and at least two duty cycles, wherein each of the at least two adjustment strategies comprises indication information of an adjustment direction of an output voltage of a power converter;

determining a first adjustment strategy;

generating a pulse width modulation (PWM) signal based on the first adjustment strategy and the first mapping relation, wherein a duty cycle of the PWM signal is one of the at least two duty cycles indicated by the first mapping relation and corresponds to the first adjustment strategy; and transmitting the PWM signal to a filter such that the filter, based on the PWM signal and second mapping relation, generates a voltage feedback signal and transmits the voltage feedback signal to the power converter, wherein the second mapping relation is a one-to-one mapping relation between the at least two duty cycles and at least two feedback voltage values, and each of the at least two feedback voltage values corresponding to the voltage feedback signal is a voltage value indicated by the second mapping relation and corresponds to the duty cycle of the PWM signal.

7. The charging apparatus of controlling output voltages according to claim 6, wherein the processor is configured to execute the executable program instructions performing following operation:

transmitting the PWM signal by a pin.

8. The charging apparatus of controlling output voltages according to claim 6, wherein each of the adjustment strategies further comprises indication information of an adjustment amplitude of the output voltage of the power converter.

9. The charging apparatus of controlling output voltages according to claim 6, wherein the processor is configured to execute the executable program instructions performing following operations:

receiving control information transmitted by an external device, wherein the external device receives the output voltage and the control information is configured to determine the first adjustment strategy; and determining the first adjustment strategy based on the control information.

10. The charging apparatus of controlling output voltages according to claim 6, wherein the processor is configured to execute the executable program instructions performing following operations:

determining a target output voltage;

determining a first output voltage, wherein the first output voltage is a voltage output by the power converter before a first time interval; and determining the first adjustment strategy based a difference between the first output voltage and a preset target output voltage, wherein the first adjustment strategy is configured to adjust the output voltage of the power converter in the first time interval such that the output voltage of the power converter in the first time interval approaches the target output voltage.

11. An adapter, comprising:

a power converter configured to obtain an alternating current from a power source and convert the alternating current into a direct current; and a controller configured to generate, based on a first adjustment strategy of at least two adjustment strategies and first mapping relation, a PWM signal for transmitting the PWM signal, such that an adjustment direction of an output voltage of the direct current of the power converter corresponds to the first adjustment strategy, wherein the first mapping relation is a one-to-one mapping relation between the at least two adjustment strategies and at least two duty cycles, each of the adjustment strategies comprises indication information of the adjustment direction of the output voltage of the power converter, and the duty cycle of the PWM signal is one of the at least two duty cycles indicated by the first mapping relation and corresponds to the first adjustment strategy of the at least two adjustment strategies;

a filter connected to the power converter and the controller for receiving the PWM signal, and configured to generate, based on the PWM signal and second mapping relation, a voltage feedback signal for transmitting the voltage feedback signal to the power converter, wherein the second mapping relation is a one-to-one mapping relation between the at least two duty cycles and at least two feedback voltage values, the voltage feedback signal carries the at least two feedback voltage values, and each of the at least two feedback voltage values corresponding to the voltage feedback signal is a voltage value indicated by the second mapping relation and correspond to the duty cycle of the PWM signal; and the power converter further configured to adjust the output voltage based on the voltage feedback signal.

* * * * *